United States Patent
Zheng et al.

(10) Patent No.: US 11,679,797 B2
(45) Date of Patent: Jun. 20, 2023

(54) UNLOCK DEVICE AND STROLLER

(71) Applicant: Wonderland Switzerland AG, Steinhausen (CH)

(72) Inventors: Leilei Zheng, Guangdong (CN); Zheng-Wen Guo, Guangdong (CN); Er-Xue Wang, Guangdong (CN); Mingxing Sun, Guangdong (CN); Shoufeng Hu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 157 days.

(21) Appl. No.: 16/991,059

(22) Filed: Aug. 12, 2020

(65) Prior Publication Data
US 2021/0046968 A1    Feb. 18, 2021

(30) Foreign Application Priority Data

Aug. 12, 2019  (CN) .......................... 201910742073.0
Nov. 12, 2019  (CN) .......................... 201911103663.5

(51) Int. Cl.
*B62B 7/06* (2006.01)
*B62B 9/08* (2006.01)

(52) U.S. Cl.
CPC ................ *B62B 9/085* (2013.01); *B62B 7/06* (2013.01); *B62B 9/087* (2013.01); *B62B 2205/24* (2013.01)

(58) Field of Classification Search
CPC ........... B62B 9/08; B62B 9/085; B62B 9/087; B62B 7/06; B62B 2205/20; B62B 2205/22; B62B 2205/24
See application file for complete search history.

(56) References Cited

U.S. PATENT DOCUMENTS

| 5,511,441 | A  | * | 4/1996  | Arai    | B62B 7/08 |
|           |    |   |         |         | 280/47.38 |
| 5,524,503 | A  |   | 6/1996  | Ishikura |          |
| 6,339,862 | B1 |   | 1/2002  | Cheng   |           |
| 6,824,161 | B2 | * | 11/2004 | Iwata   | B62B 7/08 |
|           |    |   |         |         | 280/655.1 |

(Continued)

FOREIGN PATENT DOCUMENTS

| CN | 101497346 A | 8/2009  |
| CN | 102211603 A | 10/2011 |

(Continued)

OTHER PUBLICATIONS

"International Search Report" dated Oct. 26, 2020 for International application No. PCT/EP2020/072655, International filing date:Aug. 12, 2020.

*Primary Examiner* — John D Walters
(74) *Attorney, Agent, or Firm* — Winston Hsu

(57) ABSTRACT

An unlock device includes at least one operating member, a first unlock module and a second unlock module. The at least one operating member is movably disposed on a frame, wherein the frame is equipped with a first lock mechanism and a second lock mechanism. The first unlock module is movably disposed on the frame and connected to the first lock mechanism. The second unlock module is movably disposed on the frame and connected to the second lock mechanism. The at least one operating member moves to drive the first unlock module to move to unlock the first lock mechanism or drive the second unlock module to move to unlock the second lock mechanism.

21 Claims, 18 Drawing Sheets

(56) References Cited

U.S. PATENT DOCUMENTS

| | | | |
|---|---|---|---|
| 8,616,647 B2 * | 12/2013 | Chen | ........................ B62B 9/104 |
| | | | 280/47.38 |
| 2003/0034211 A1 | 2/2003 | Iwata | |
| 2003/0204933 A1 | 11/2003 | Yeh | |
| 2017/0021849 A1 | 1/2017 | Giampavolo | |
| 2021/0053606 A1 | 2/2021 | Fan | |

FOREIGN PATENT DOCUMENTS

| | | |
|---|---|---|
| CN | 204871148 U | 12/2015 |
| CN | 206155527 U | 5/2017 |
| CN | 108297767 A | 7/2018 |
| CN | 109789888 A | 5/2019 |
| EP | 0 494 701 A2 | 7/1992 |
| EP | 0 595 096 A1 | 5/1994 |
| EP | 0 646 513 B1 | 12/1996 |
| EP | 2 336 000 A2 | 6/2011 |
| EP | 2 336 000 A3 | 7/2015 |
| JP | 7-22882 U | 4/1995 |
| JP | 2003-54418 A | 2/2003 |
| JP | 2016-64688 A | 4/2016 |
| TW | M245120 | 10/2004 |
| TW | 201331077 A1 | 8/2013 |

* cited by examiner

UNLOCK DEVICE AND STROLLER

BACKGROUND OF THE INVENTION

1. Field of the Invention

The invention relates to a baby product and, more particularly, to an unlock device and a stroller equipped with the unlock device.

2. Description of the Prior Art

A stroller is a transportation designed to provide convenience for outdoor activities of infants and children, and it has been widely used for a long time. At present, some strollers comprise a frame, a frame folding mechanism, a front wheel, a rear wheel and a wheel rotation orientation mechanism. The frame folding mechanism is configured to fold the frame. In this way, when the stroller is not in use, it can be folded into a smaller volume for easy carrying and storage. The wheel rotation orientation mechanism is configured to lock or unlock the rotatable rear wheel. The wheel rotation orientation mechanism unlocks the rear wheel, such that the rear wheel can rotate freely. When reversing, the rear wheel can rotate with a specific angle to facilitate the change of orientation for the stroller. After the change of orientation, the wheel rotation orientation mechanism can be used to lock the rear wheel to reposition the rear wheel to move forward. However, the aforesaid mechanisms occupy much space of the stroller, the operation is extremely inconvenient, and the stroller is unsightly, such that the purchase intention of a consumer may reduce.

SUMMARY OF THE INVENTION

The invention provides an unlock device and a stroller equipped with the unlock device, so as to solve the aforesaid problems.

According to an embodiment of the invention, an unlock device comprises at least one operating member, a first unlock module and a second unlock module. The at least one operating member is movably disposed on a frame, wherein the frame is equipped with a first lock mechanism and a second lock mechanism. The first unlock module is movably disposed on the frame and connected to the first lock mechanism. The second unlock module is movably disposed on the frame and connected to the second lock mechanism. The at least one operating member moves to drive the first unlock module to move to unlock the first lock mechanism or drive the second unlock module to move to unlock the second lock mechanism.

In another embodiment, the unlock device may further comprising a selecting member movably disposed on the frame. The selecting member moves between a first position and a second position with respect to the frame. When the selecting member is located at the first position, the at least one operating member slides to drive the first unlock module to move to unlock the first lock mechanism. When the selecting member is located at the second position, the at least one operating member slides to drive the second unlock module to move to unlock the second lock mechanism.

In another embodiment, the at least one operating member may comprise a first operating member and a second operating member. The first operating member slides to drive the first unlock module to move to unlock the first lock mechanism, and the second operating member slides to drive the second unlock module to move to unlock the second lock mechanism.

In another embodiment, the unlock device may further comprise a retaining mechanism disposed on the at least one operating member. The retaining mechanism retains the at least one operating member at an unlock position when the at least one operating member slides to unlock one of the first lock mechanism and the second lock mechanism. The retaining mechanism releases the at least one operating member when the at least one operating member is actuated from the unlock position.

According to an embodiment of the invention, a stroller comprises a frame, a wheel socket, a first lock mechanism, a second lock mechanism and the aforesaid unlock device. The wheel socket is rotatably disposed on a leg of the frame. The first lock mechanism is disposed on the frame and configured to fold the frame. The second lock mechanism is disposed on the frame and configured to lock the wheel socket. The unlock device is configured to unlock the first lock mechanism and the second lock mechanism.

As mentioned in the above, the invention uses at least one operating member to drive the first unlock module to move to unlock the first lock mechanism or drive the second unlock module to move to unlock the second lock mechanism. In an embodiment, a selecting member may be movably disposed on the frame and capable of moving between a first position and a second position with respect to the frame. When the selecting member is located at the first position, the first lock mechanism corresponds to the operating member, such that the operating member can slide to drive the first unlock module to move to unlock the first lock mechanism. When the selecting member is located at the second position, the second lock mechanism corresponds to the operating member, such that the operating member can slide to drive the second unlock module to move to unlock the second lock mechanism. Accordingly, the invention does not need to dispose two independent unlock devices for unlocking the first and second lock mechanisms. That is to say, the invention can use one single unlock device to unlock two different lock mechanisms. Therefore, the manufacturing cost is reduced, the unlock device of the invention occupies less space of the stroller, and the operation is easy and convenient.

In another embodiment, the at least one operating member may comprise a first operating member and a second operating member configured to unlock the first lock mechanism and the second lock mechanism, respectively. In other words, the invention may also use two operating members to unlock two different lock mechanisms.

In another embodiment, the invention may use a retaining mechanism to retain the operating member at an unlock position when the operating member slides to unlock the first lock mechanism or the second lock mechanism. Accordingly, the first lock mechanism or the second lock mechanism can be retained at an unlock state until the operating member is actuated from the unlock position. For example, the second lock mechanism may be a wheel rotation orientation mechanism and the retaining mechanism may retain the operating member at an unlock position when the operating member slides to unlock the second lock mechanism. When a user presses the operating member to unlock the wheel rotation orientation mechanism, the wheel rotation orientation mechanism is retained at the unlock position, such that a wheel can still rotate freely even if the user releases the operating member. Furthermore, when the operating member is actuated from the unlock position, the retaining mechanism releases the operating member, such that the operating member slides to lock the wheel rotation orientation mechanism and then the wheel is locked.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
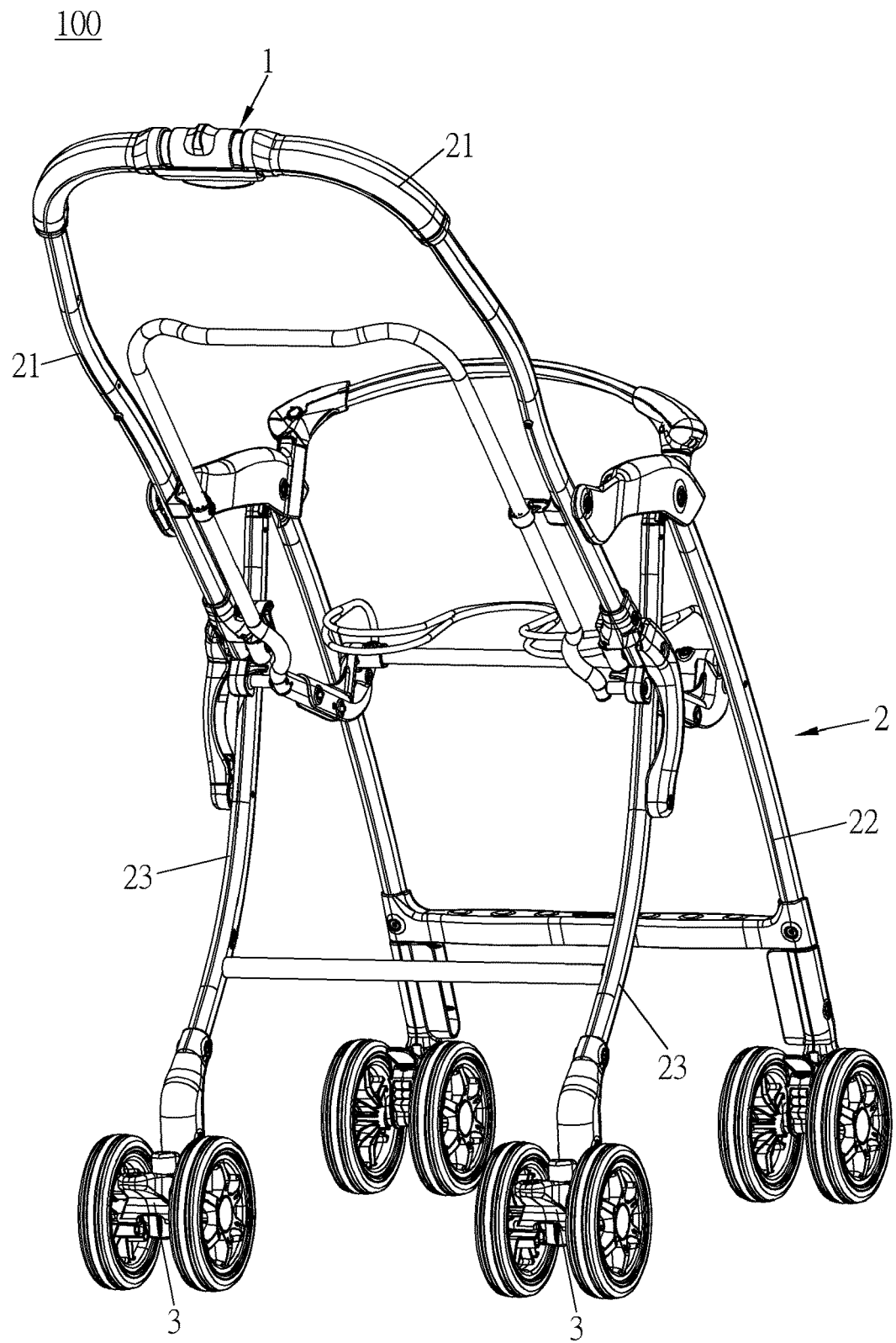
FIG. 1 is a perspective view illustrating a stroller of the invention.
Figure 2:
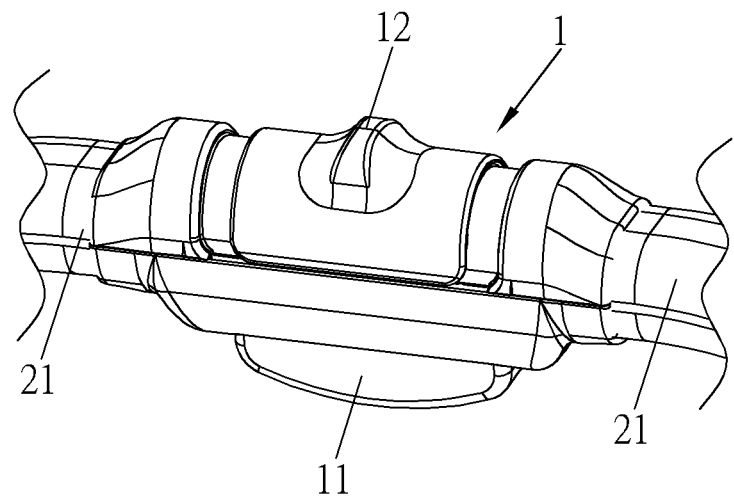
FIG. 2 is a perspective view illustrating an unlock device of the invention.
Figure 3:
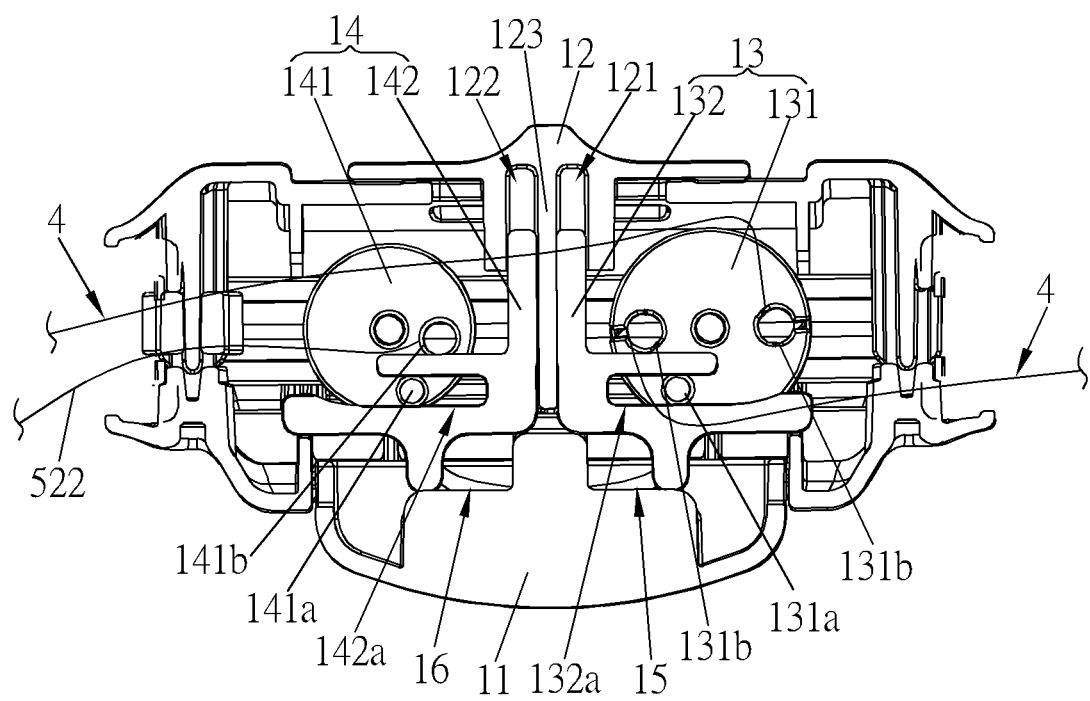
FIG. 3 is a sectional view illustrating an unlock device of the invention connected to a first lock mechanism and a second lock mechanism.

Referring to FIGS. 1 to 3, a stroller 100 of the invention comprises a frame 2, a wheel socket 3, a first lock mechanism 4, a second lock mechanism 5 and an unlock device 1. In this embodiment, the first lock mechanism 4 may be, but not limited to, a frame folding mechanism and the second lock mechanism 5 may be, but not limited to, a wheel rotation orientation mechanism. The frame 2 comprises a handle 21, a front leg 22 and a rear leg 23, wherein the front leg 22 and the rear leg 23 are legs of the frame 2 and each wheel socket is equipped with a wheel. The first lock mechanism 4 is disposed on the frame 2 and configured to fold the frame 2, wherein the first lock mechanism 4 is well known by one skilled in the art. In general, the first lock mechanism 4 may comprise a wire and a lock member. One end of the wire is connected to the lock member and the lock member is engaged between the handle 21 and the rear leg 23 of the frame 2. When the other end of the wire is pulled, the wire drives the lock member to release the engagement to unlock the frame 2, such that the frame 2 can be folded. Since the first lock mechanism 4 is well known by one skilled in the art, the figure only illustrates the wire of the first lock mechanism 4.

In an exemplary embodiment, the first lock mechanism 4 or the second lock mechanism 5 could be, but not limited to, one of the lock mechanism of handle conversion, wheel braking, handle angle adjustment, frame folding and wheel swiveling lock, but their functions will not duplicate each other.

Figure 8:
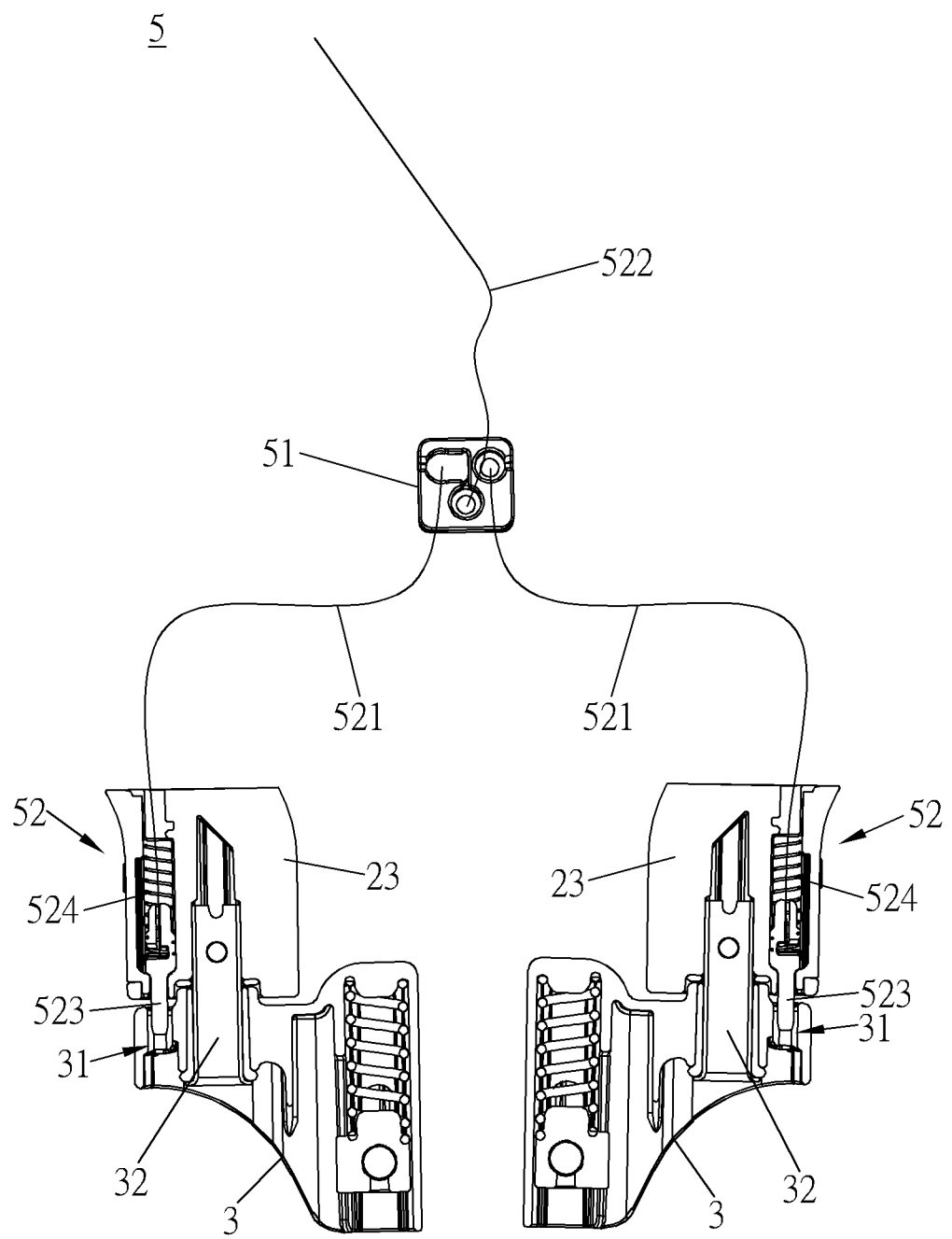
FIG. 8 is a schematic view illustrating a second lock mechanism of the invention.

Referring to FIGS. 1 and 8, the wheel socket 3 is rotatably disposed on the rear leg 23 through a central shaft 32, such that the wheel socket 3 can drive the wheel to rotate around the central shaft 32. The second lock mechanism 5 is disposed on the frame 2 and configured to lock the wheel socket 3. The second lock mechanism 5 comprises a linkage member 51 and a couple of positioning assemblies 52 connected to the linkage member 51. The positioning assembly 52 comprises a first drag member 521, a second drag member 522, a positioning member and a return member 524. The wheel socket 3 has a positioning portion, wherein the positioning portion may be a positioning hole 31. The positioning member may be a positioning pillar 523 configured to cooperate with the positioning hole 31. The positioning pillar 523 may be telescopically disposed in the positioning hole 31. The linkage member 51 is slidably disposed on the frame 2. An end of the first drag member 521 is connected to the linkage member 51 and another end of the first drag member 521 is connected to the positioning member. The positioning member is movably disposed on the leg of the frame 2 and capable of being connected to or separated from the positioning portion. The return member 524 provides an elastic force for pushing the positioning member toward the positioning portion. The second drag member 522 is connected between a second lock module 14 and the linkage member 51. When the second drag member 522 is pulled, the second drag member 522 pulls the linkage member 51 to slide with respect to the frame 2, so as to drive two first drag members 521 to pull two positioning pillars 523, such that the two positioning pillars 523 retract into the rear legs 23 and compress the return members 524 (e.g. springs). At this time, the two positioning pillars 523 are ejected from the positioning holes 31 of the wheel sockets 3 to unlock the wheel sockets 3. Consequently, the wheel sockets 3 can rotate around the central shaft 32.

The unlock device 1 is configured to unlock the first lock mechanism 4 and the second lock mechanism 5. Referring to FIGS. 2 and 3, the unlock device 1 of the invention comprises at least one operating member 11, a selecting member 12, a first unlock module 13 and a second unlock module 14. In this embodiment, the unlock device 1 comprises one operating member 11, but is not so limited. The operating member 11 is movably disposed on the frame 2. The selecting member 12 is movably disposed on the frame 2. A sliding direction of the selecting member 12 may intersect with a sliding direction of the operating member 11. The first unlock module 13 is movably disposed on the frame 2 and connected to the first lock mechanism 4. The second unlock module 14 is movably disposed on the frame 2 and connected to the second lock mechanism 5. The selecting member 12 can slide to drive the first unlock module 13 and the second unlock module 14 to move, such that one of the first unlock module 13 and the second unlock module 14 moves to a position corresponding to the operating member 11. Then, the operating member 11 can move to drive the first unlock module 13 to move to unlock the first lock mechanism 4 or drive the second unlock module 14 to move to unlock the second lock mechanism 5.

In another embodiment, the at least one operating member may comprise a first operating member and a second operating member configured to unlock the first lock mechanism and the second lock mechanism, respectively. In other words, the invention may also use two operating members to unlock two different lock mechanisms.

Referring to FIGS. 1 and 8, in this embodiment, the operating member 11 may slide upward and downward with respect to the frame 2 and the selecting member 12 may slide leftward and rightward with respect to the frame 2. To avoid misoperation, the selecting member 12 abuts against the operating member 11. The selecting member 12 may slide to be apart from the operating member 11, such that the operating member 11 may slide. Specifically, the selecting member 12 has an abutting portion 123 and the abutting portion 123 abuts against the operating member 11, such that the selecting member 12 may lock the operating member 11 by the abutting portion 123 to avoid misoperation. The first unlock module 13 is disposed between the operating member 11 and the selecting member 12. The first unlock module 13 may be movably disposed on the selecting member 12 and may slide upward and downward with respect to the selecting member 12. The first unlock module 13 abuts against the operating member 11. The first unlock module 13 is connected to the wire of the first lock mechanism 4 and can drive the wire of the first lock mechanism 4 to move. The second unlock module 14 is disposed between the operating member 11 and the selecting member 12. The second unlock module 14 may be movably disposed on the selecting member 12 and may slide upward and downward with respect to the selecting member 12. The second unlock module 14 abuts against the operating member 11. The second unlock module 14 is connected to the second drag member 522 of the second lock mechanism 5 and can drive the second drag member 522 to move. The first unlock module 13 is located at right side of the handle 21 of the frame 2 and the second unlock module 14 is located at left side of the handle 21 of the frame 2. However, the arrangement of the first unlock module 13 and the second unlock module 14 is not limited to the aforesaid manner. For example, the positions of the first unlock module 13 and the second unlock module 14 may be changed with each other.

Figure 4:
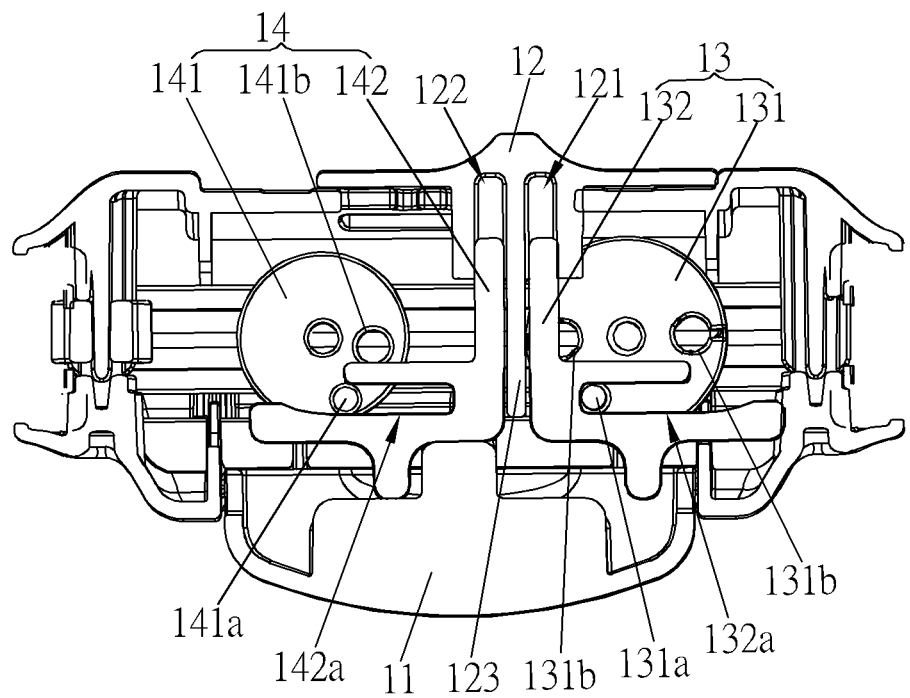
FIG. 4 is a sectional view illustrating a selecting member of an unlock device of the invention sliding rightward.
Figure 6:
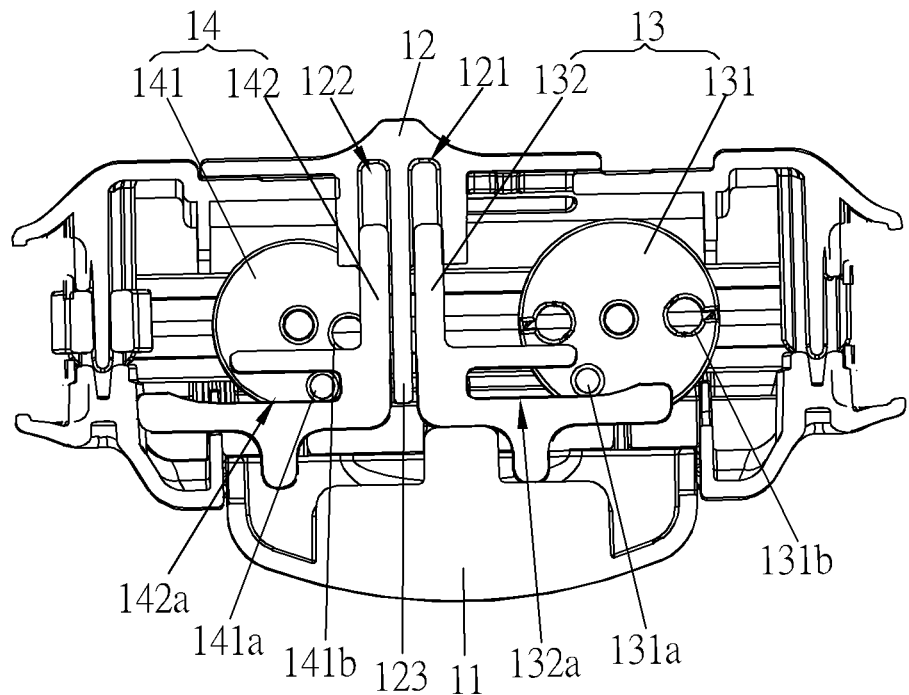
FIG. 6 is a sectional view illustrating a selecting member of an unlock device of the invention sliding leftward.

The selecting member 12 may slide to drive the first unlock module 13 and the second unlock module 14 to slide, such that the operating member 11 may slide to push one of the first unlock module 13 and the second unlock module 14, so as to unlock the first lock mechanism 4 or the second lock mechanism 5. For further explanation, the selecting member 12 may move between a first position (as shown in FIG. 6) and a second position (as shown in FIG. 4) with respect to the frame 2. When the selecting member 12 is located at the first position, the operating member 11 can slide to drive the first unlock module 13 to move to unlock the first lock mechanism 4. When the selecting member 12 is located at the second position, the operating member 11 can slide to drive the second unlock module 14 to move to unlock the second lock mechanism 5. Needless to say, in other embodiments, the first unlock module 13 and the second unlock module 14 may not abut against the operating member 11. For example, the operating member 11 may be located at a space between the first unlock module 13 and the second unlock module 14. At this time, the selecting member 12 may not abut against the operating member 11 either.

Figure 7:
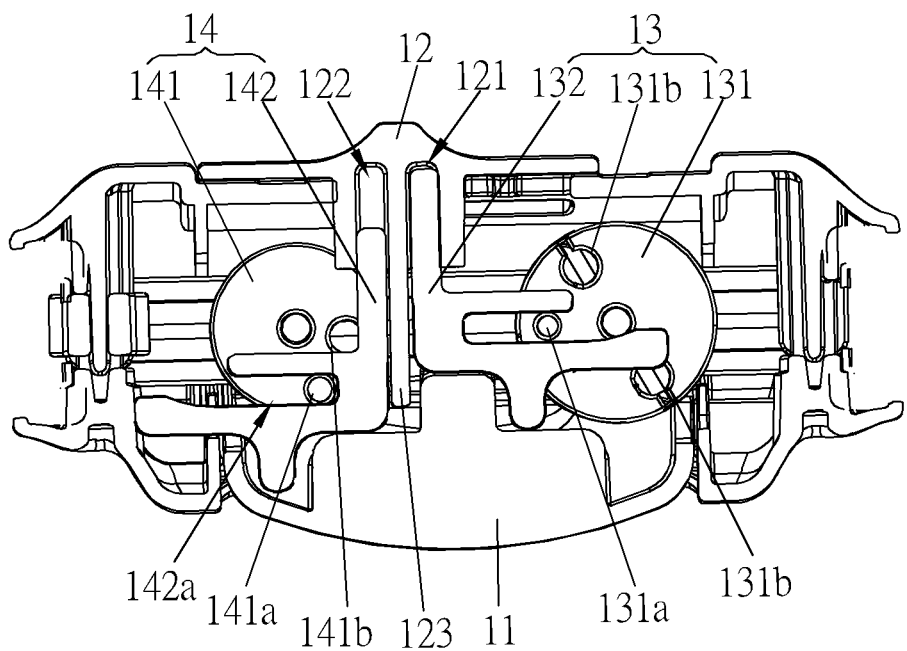
FIG. 7 is a sectional view illustrating an operating member shown in FIG. 6 being pressed upward.

Referring to FIGS. 3, 6 and 7, in this embodiment, the first unlock module 13 comprises a first rotating member 131 and a first sliding member 132. The first rotating member 131 is pivotally connected to the frame 2. The first lock mechanism 4 is connected to a position of the first rotating member 131 eccentric with respect to a rotation center of the first rotating member 131. The first sliding member 132 is slidably disposed on the frame 2. A sliding direction of the first sliding member 132 is identical to a sliding direction of the operating member 11. Specifically, the selecting member 12 has a first receiving hole 121 and an end of the first sliding member 132 is slidably inserted into the first receiving hole 121. The other end of the first sliding member 132 abuts against the operating member 11. The first sliding member 132 is configured to drive the first rotating member 131 to rotate. When the operating member 11 slides to push the first sliding member 132, the first sliding member 132 drives the first rotating member 131 to rotate. Specifically, the first rotating member 131 has a first protruding portion 131*a* and the first sliding member 132 has a first engaging groove 132*a*. The first protruding portion 131*a* is slidably disposed in the first engaging groove 132*a*. The first sliding member 132 can move to push the first protruding portion 131*a* to rotate the first rotating member 131. By means of the first engaging groove 132*a*, the first rotating member 131 can be disposed on the first sliding member 132 stably. More specifically, the first rotating member 131 has a first connecting member 131*b*, wherein the first connecting member 131*b* is eccentric with respect to a rotation center of the first rotating member 131 and connected to the first lock mechanism 4. The first rotating member 131 may have two first connecting members 131*b*. The two first connecting members 131*b* may be disposed on the first rotating member 131 symmetrically. The two first connecting members 131*b* are connected to two wires of the first lock mechanism 4, respectively. The operating member 11 may be operated to slide to push the first sliding member 132, such that the first sliding member 132 slides to push the first protruding portion 131*a*, so as to rotate the first rotating member 131. The first rotating member 131 rotates to pull the wire of the first lock mechanism 4, so as to unlock the frame 2. Consequently, the frame 2 can be folded.

Figure 5:
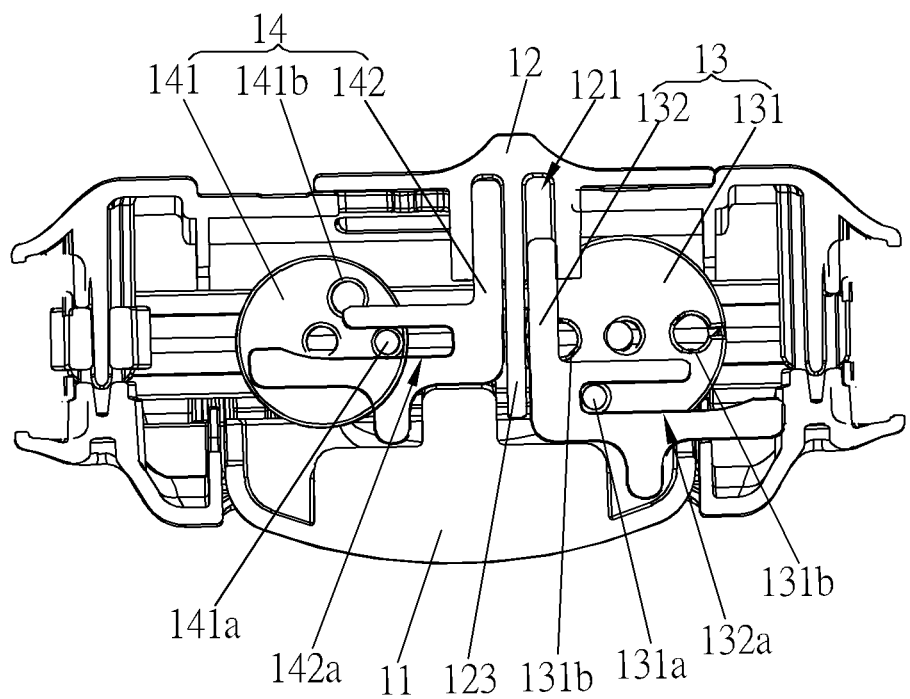
FIG. 5 is a sectional view illustrating an operating member shown in FIG. 4 being pressed upward.

Referring to FIGS. 3 to 5, in this embodiment, the second unlock module 14 comprises a second rotating member 141 and a second sliding member 142. The second rotating member 141 is pivotally connected to the frame 2. The second lock mechanism 5 is connected to a position of the second rotating member 141 eccentric with respect to a rotation center of the first rotating member 141. The second sliding member 142 is slidably disposed on the frame 2. A sliding direction of the second sliding member 142 is identical to a sliding direction of the operating member 11. That is to say, the sliding directions of the first and second sliding members 132, 142 both are identical to the sliding direction of the operating member 11. Specifically, the selecting member 12 has a second receiving hole 122 and an end of the second sliding member 142 is slidably inserted into the second receiving hole 122. The other end of the second sliding member 142 abuts against the operating member 11. The second sliding member 142 is configured to drive the second rotating member 141 to rotate. When the operating member 11 slides to push the second sliding member 142, the second sliding member 142 drives the second rotating member 141 to rotate. Specifically, the second rotating member 141 has a second protruding portion 141a and the second sliding member 142 has a second engaging groove 142a. The second protruding portion 141a is slidably disposed in the second engaging groove 142a. The second sliding member 142 can move to push the second protruding portion 141a to rotate the second rotating member 141. By means of the second engaging groove 142a, the second rotating member 141 can be disposed on the second sliding member 142 stably. More specifically, the second rotating member 141 has a second connecting member 141b, wherein the second connecting member 141b is eccentric with respect to a rotation center of the second rotating member 141 and connected to the second lock mechanism 5. The operating member 11 may be operated to slide to push the second sliding member 142, such that the second sliding member 142 slides to push the second protruding portion 141a, so as to rotate the second rotating member 141. The second rotating member 141 rotates to pull the second drag member 522 of the second lock mechanism 5 to eject the positioning pillar 523 from the positioning hole 31 of the wheel socket 3, so as to unlock the wheel socket 3. Consequently, the wheel socket 3 can rotate around the central shaft 32.

Referring to FIG. 3, in this embodiment, the first unlock module 13 and the second unlock module 14 are arranged symmetrically. The first unlock module 13 and the second unlock module 14 may be implemented by the cooperation between the sliding member and the rotating member, but is not so limited. In other embodiments, the first unlock module 13 may only dispose the first sliding member 132 and the first lock mechanism 4 is connected to the first sliding member 132. The first sliding member 132 may be pushed to slide to unlock the first lock mechanism 4. Alternatively, the second unlock module 14 may only dispose the second sliding member 142 and the second lock mechanism 5 is connected to the second sliding member 142. The second sliding member 142 may be pushed to slide to unlock the second lock mechanism 5. Alternatively, the first unlock module 13 and the second unlock module 14 may be arranged asymmetrically. One of the first unlock module 13 and the second unlock module 14 may be slidably disposed on the frame 2 and the other one of the first unlock module 13 and the second unlock module 14 may be pivotally connected to the frame 2. For example, one of the first unlock module 13 and the second unlock module 14 may be a sliding member slidably disposed on frame 2, and the other one of the first unlock module 13 and the second unlock module 14 may be a rotating member pivotally connected to the frame 2. The sliding member and the rotating member are connected to two different lock mechanisms and configured to unlock the two different lock mechanisms, respectively.

Figure 9:
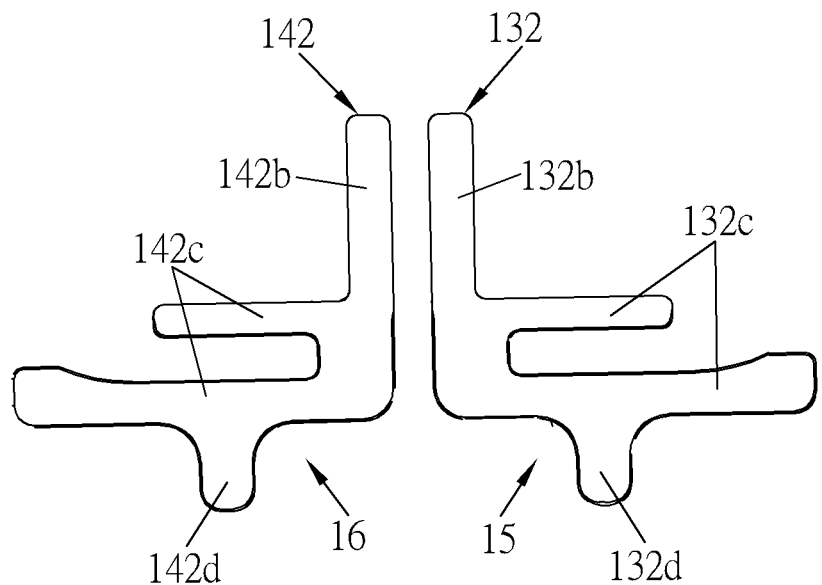
FIG. 9 is a schematic view illustrating a first sliding member and a second sliding member of the invention.

Referring to FIGS. 3 and 9, in this embodiment, the first sliding member 132 comprises a first sliding portion 132b, a first driving portion 132c connected to the first sliding portion 132b, and a first restricting portion 132d connected to the first driving portion 132c. The first sliding portion 132b is slidably inserted into the selecting member 12. The first driving portion 132c is connected to the first rotating member 131. The first restricting portion 132d is disposed at a side of the first driving portion 132c. The second sliding member 142 comprises a second sliding portion 142b, a second driving portion 142c connected to the second sliding portion 142b, and a second restricting portion 142d connected to the second driving portion 142c. The second sliding portion 142b is slidably inserted into the selecting member 12. The second driving portion 142c is connected to the second rotating member 141. The second restricting portion 142d is disposed at a side of the second driving portion 142c. When the operating member 11 slides to push one of the first unlock module 13 and the second unlock module 14, a first accommodating space 15 is formed between the first sliding member 132 and the operating member 11 and a second accommodating space 16 is formed between the second sliding member 142 and the operating member 11, so as to prevent the other one of the first unlock module 13 and the second unlock module 14 from interfering with the operating member 11. When the operating member 11 slides to push one of the first unlock module 13 and the second unlock module 14, the operating member 11 may be accommodated in the first accommodating space 15 or the second accommodating space 16.

Figure 10:
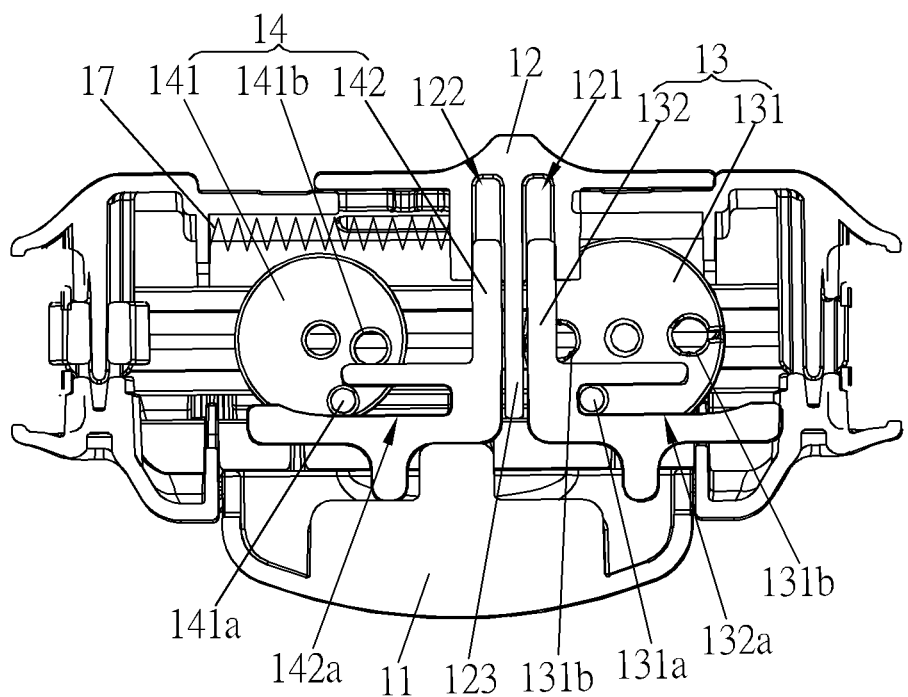
FIG. 10 is a sectional view illustrating a selecting member of the invention located at a second position.
Figure 11:
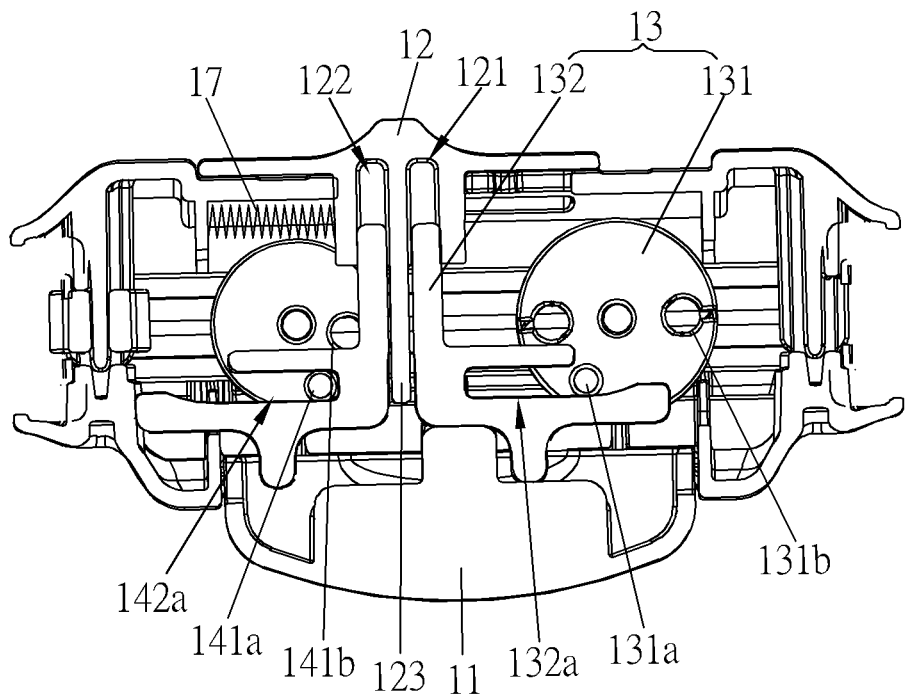
FIG. 11 is a sectional view illustrating a selecting member of the invention located at a first position.
Figure 12:
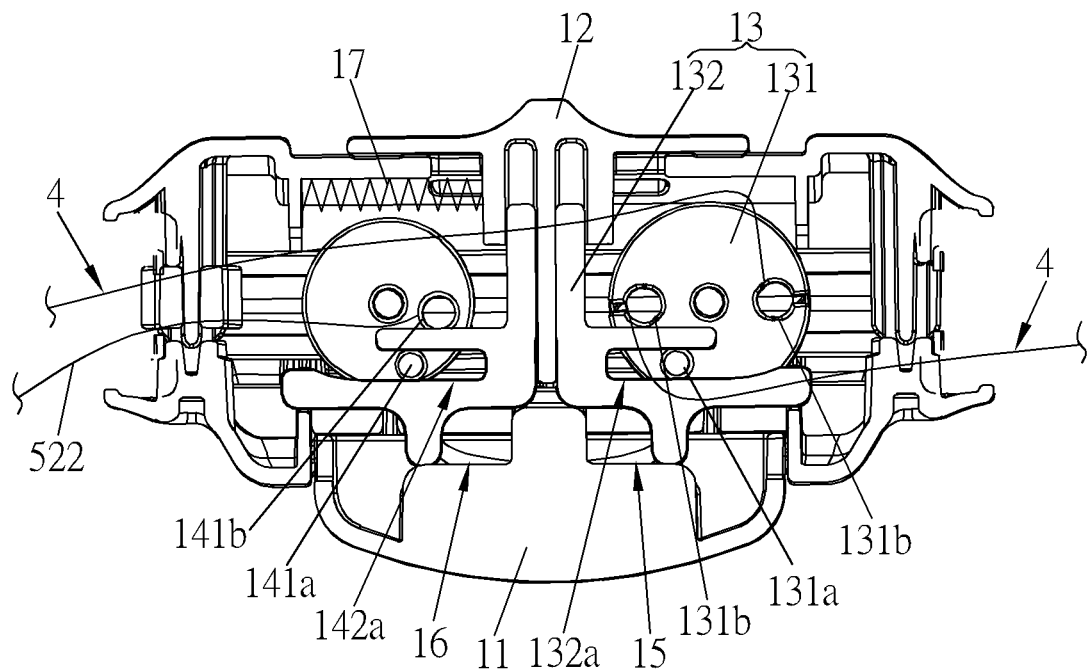
FIG. 12 is a sectional view illustrating a selecting member of the invention located between a first position and a second position.
Figure 13:
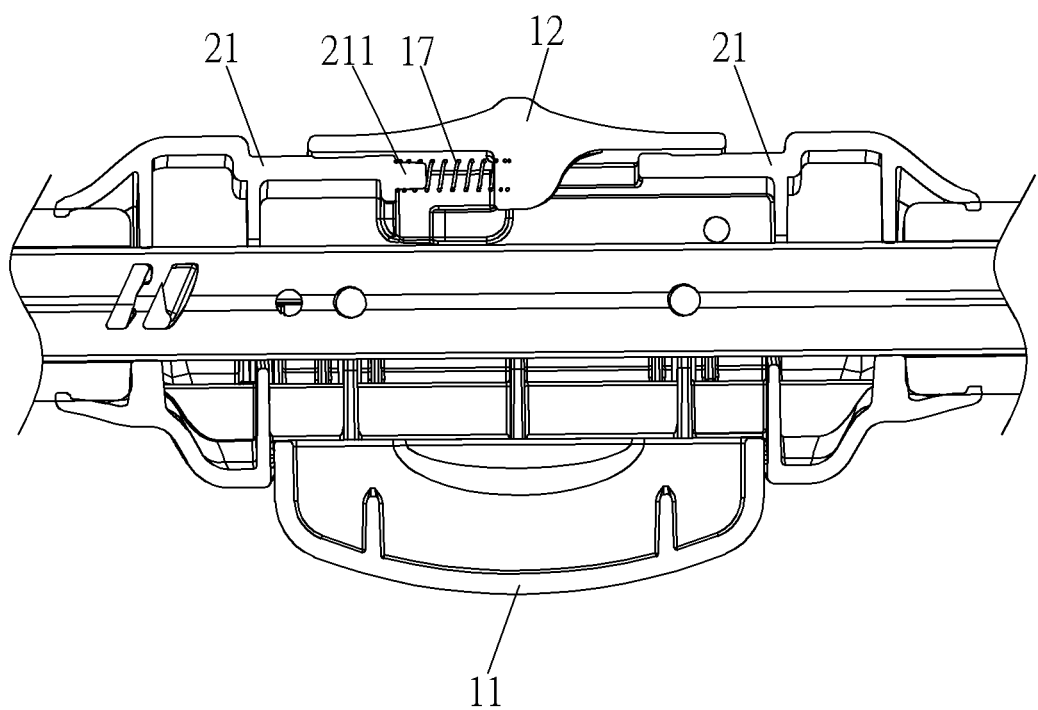
FIG. 13 is a sectional view illustrating an end of an elastic member of the invention sleeved on a protruding block.

Referring to FIGS. 10 to 13, the selecting member 12 may move between a first position (as shown in FIG. 11) and a second position (as shown in FIG. 10) with respect to the frame 2. As shown in FIG. 11, when the selecting member 12 is located at the first position, the operating member 11 corresponds to the first unlock module 13. As shown in FIG. 10, when the selecting member 12 is located at the second position, the operating member 11 corresponds to the second unlock module 14. During the operation of the selecting member 12, the following misoperation may occur. A user essentially wants to operate the selecting member 12 to slide toward the second position to make the operating member 11 correspond to the second unlock module 14 and then operate the operating member 11 to slide to push the second unlock module 14 to unlock the second lock mechanism 5. However, the user misoperates the selecting member 12 to slide toward the first position to make the operating member 11 correspond to the first unlock module 13 and then presses the operating member 11 to slide to push the first unlock module 13. If there is a child seated in the stroller 100, the frame 2 may be folded to harm the child seated in the stroller 100. Accordingly, to avoid the aforesaid misoperation, an elastic member 17 may be disposed between the selecting member 12 and the frame 2 and configured to make the selecting member 12 away from the first position. By means of the elastic member 17, when the user misoperates the selecting member 12 to slide toward the first position, the selecting member 12 compresses the elastic member 17. After the user releases the selecting member 12, the selecting member 12 will return to the original position due to an elastic force of the elastic member 17. Then, the selecting member 12 drives the first sliding member 132 of the first unlock module 13 and the second sliding member 142 of the second unlock module 14 to return to the original position, such that the operating member 11 cannot slide to push the first unlock module 13. Consequently, the frame 2 cannot be unlocked and folded, so as to increase safety for the stroller 100. After the selecting member 12 returns to the original position, the selecting member 12 abuts against the operating member 11 again to lock the operating member 11. Specifically, the elastic member 17 may be, but not limited to, a spring. The elastic member 17 may also be other elastic objects. To position the elastic member 17 well, the frame 2 may have a protruding block 211, an end of the elastic member 17 may be sleeved on the protruding block 211 and abuts against the frame 2, and another end of the elastic member 17 may abut against the selecting member 12. However, the invention is not limited to the aforesaid embodiment.

Referring to FIGS. 10 and 11, in the second preferred embodiment of the invention, the elastic member 17 may provide an elastic force to force the selecting member 12 to return to the second position, wherein the second position of the selecting member 12 may be set to be an initial state of the selecting member 12. The operating member 11 may be pressed directly to push the second unlock module 14 to unlock the second lock mechanism 5. When the frame 2 needs to be folded, the selecting member 12 has to slide from the second position to the first position and be kept at the first position, so as to make the operating member 11 correspond to the first unlock module 13. Then, the operating member 11 can drive the first unlock module 13 to slide to unlock the first lock mechanism 4. During the aforesaid operation, the elastic member 17 is compressed and deforms. When the selecting member 12 is released, the selecting member 12 will return to the second position due to the elastic force of the elastic member 17.

Referring to FIG. 2, to facilitate the operation of the unlock device 1 of the invention, the unlock device 1 may be disposed on an upper side of the handle 21 of the frame 2. Needless to say, in other embodiments, the unlock device 1 may also be disposed on other positions of the frame 2.

It should be noted that the unlock device 1 of the invention is not limited to unlock the frame folding mechanism and the wheel rotation orientation mechanism. The first connecting member 131b of the first unlock module 13 and the second connecting member 141b of the second unlock module 14 may be connected to other lock mechanisms of the stroller, such as a handle rotation lock mechanism and so on. Furthermore, the unlock device 1 of the invention is not limited to be applied to the stroller. The unlock device 1 may be used to unlock two different lock mechanisms in other fields.

Referring to FIGS. 3 to 7, the operation of the unlock device 1 of the invention is depicted as below. In the beginning, the operating member 11 abuts against the first sliding member 132 and the second sliding member 142 simultaneously. When the first lock mechanism 4 needs to be unlocked, the selecting member 12 is operated to move leftward to drive the first unlock module 13 and the second unlock module 14 to move leftward, such that the selecting member 12 is separated from the operating member 11 to unlock the operating member 11, the second sliding member 142 of the second unlock module 14 is also separated from the operating member 11, and the first sliding member 132 of the first unlock module 13 still abuts against the operating member 11. When the operating member 11 is pressed, the operating member 11 slides upward to push the first sliding member 132 to slide. The first sliding member 132 slides to push the first protruding portion 131a to drive the first rotating member 131 to rotate. The first rotating member 131 rotates to pull the wire of the first lock mechanism 4, such that the frame 2 is unlocked. Consequently, the frame 2 can be folded. When the second lock mechanism 5 needs to be unlocked, the selecting member 12 is operated to slide rightward to drive the first unlock module 13 and the second unlock module 14 to move rightward, such that the selecting member 12 is separated from the operating member 11 to unlock the operating member 11, the first sliding member 132 of the first unlock module 13 is also separated from the operating member 11, and the second sliding member 142 of the second unlock module 14 still abuts against the operating member 11. When the operating member 11 is pressed, the operating member 11 slides upward to push the second sliding member 142 to slide. The second sliding member 142 slides to push the second protruding portion 141a to drive the second rotating member 141 to rotate. The second rotating member 141 rotates to pull the second drag member 522 of the second lock mechanism 5, such that the positioning pillar 523 is ejected from the positioning hole 31 of the wheel socket 3 and then the wheel socket 3 is unlocked. Consequently, the wheel socket 3 can rotate around the central shaft 32.

Figure 14:
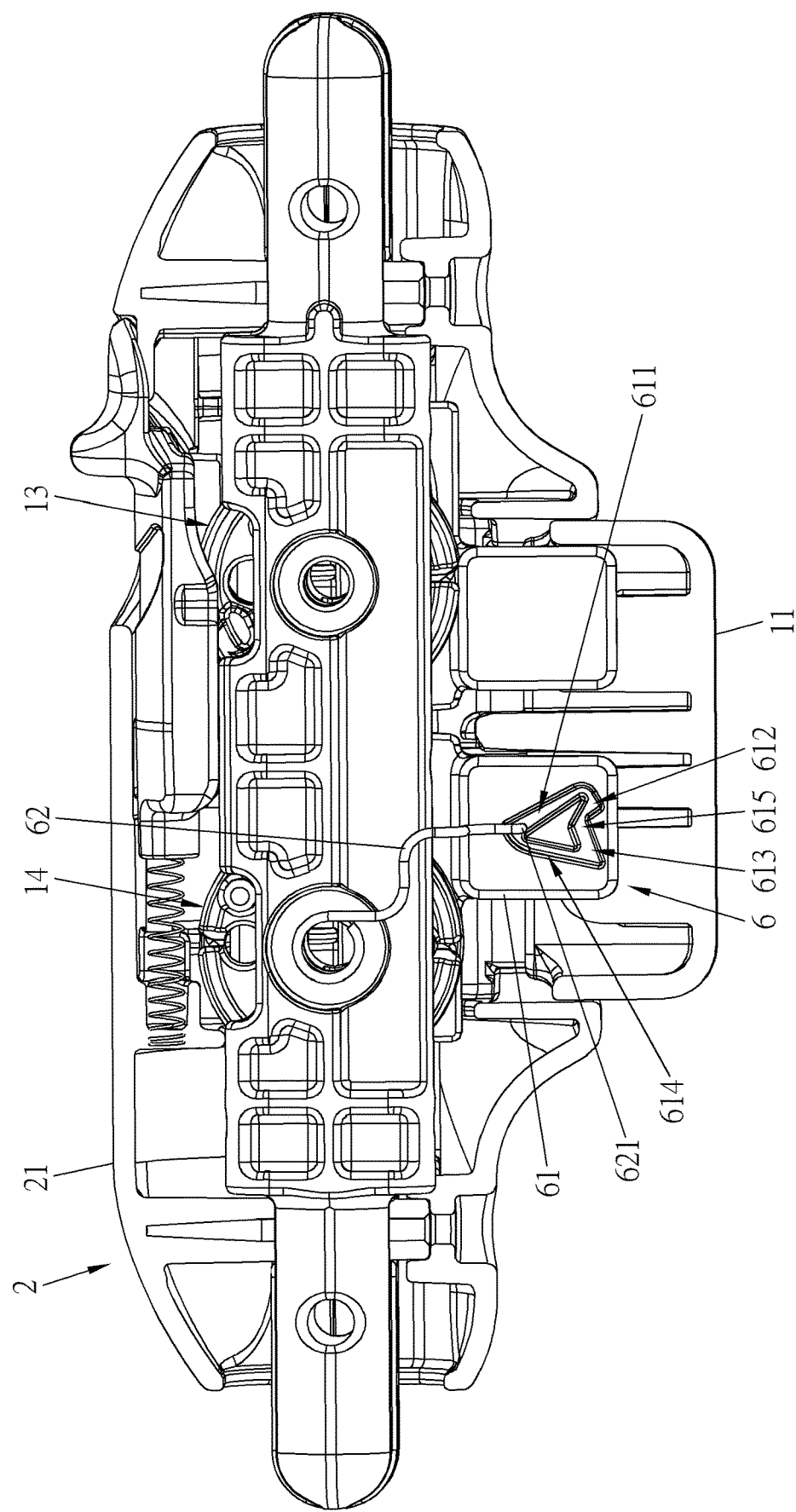
FIG. 14 is a sectional view illustrating a retaining mechanism of the invention disposed on an operating member.
Figure 15:
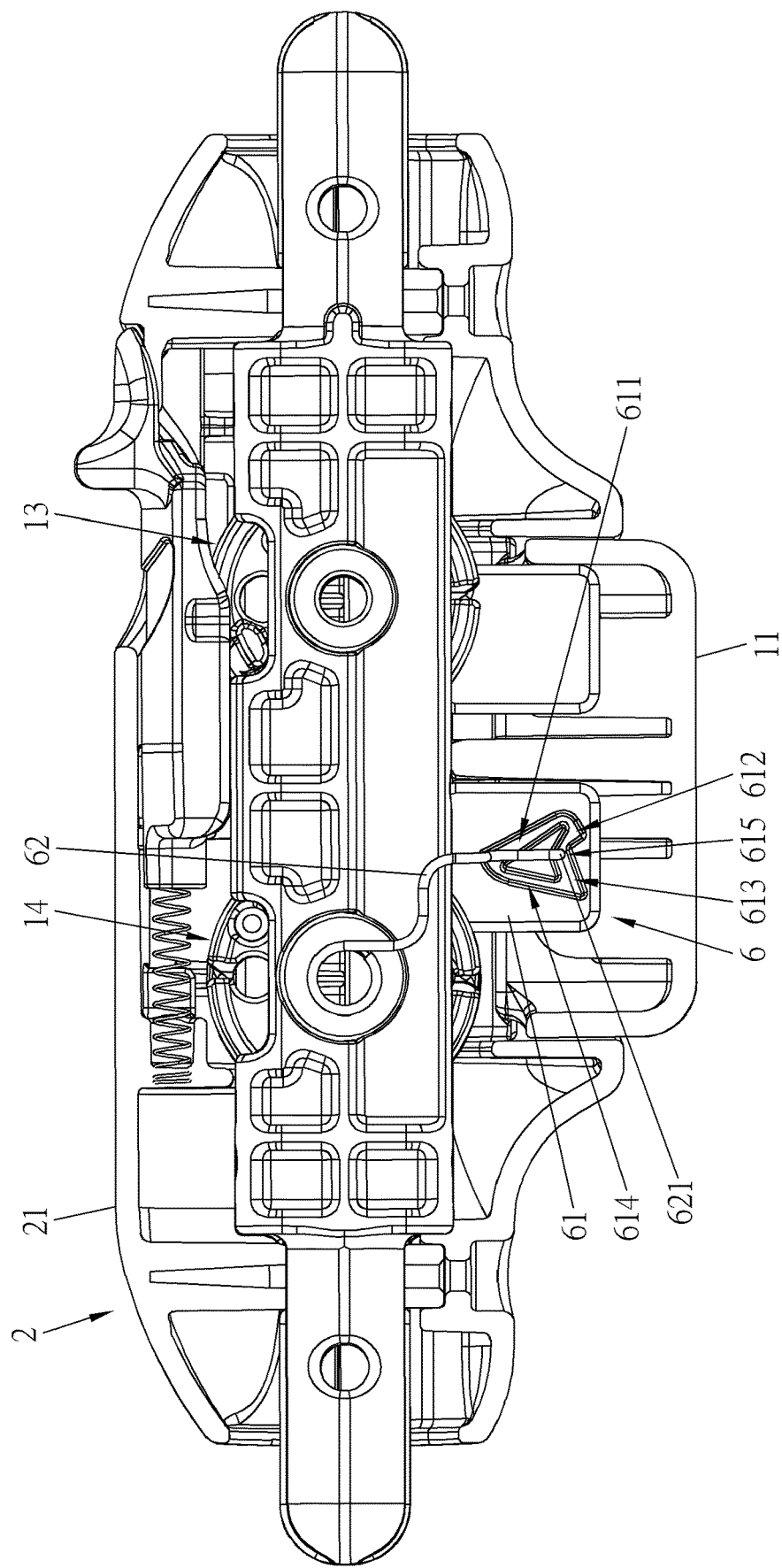
FIG. 15 is a sectional view illustrating the operating member shown in FIG. 14 being pressed upward.

Referring to FIGS. 14 and 15, the unlock device 1 of the invention may further comprise a retaining mechanism 6 disposed on the operating member 11. The retaining mechanism 6 can retain the operating member 11 at an unlock position (as shown in FIG. 15) when the operating member 11 slides to unlock one of the first lock mechanism 4 and the second lock mechanism 5. Furthermore, the retaining mechanism 6 can release the operating member 11 when the operating member 11 is actuated from the unlock position.

In this embodiment, the retaining mechanism 6 may comprise a first engaging member 61 and a second engaging member 62. The first engaging member 61 is fixed on the operating member 11. The second engaging member 62 is connected to the frame 2. If the unlock device 1 is disposed on handle 21 of the frame 2, the second engaging member 62 may be disposed in and connected to the handle 21 of the frame 2. The first engaging member 61 has a first inclined groove 611, a second inclined groove 612, a third inclined groove 613 and a fourth inclined groove 614 connected to each other. An end of the second engaging member 62 has an engaging portion 621.

When a user presses the operating member 11 to unlock the first lock mechanism 4 or the second lock mechanism 5, the engaging portion 621 of the second engaging member 62 moves along the first and second inclined grooves 611, 612 and then engages in a recess 615 between the second and third inclined grooves 612, 613 to retain the operating member 11 at the unlock position (as shown in FIG. 15). At this time, the first lock mechanism 4 or the second lock mechanism 5 is retained at the unlock position. Furthermore, when the operating member 11 is actuated from the unlock position (i.e. the operating member 11 located at the unlock position is pressed again), the engaging portion 621 of the second engaging member 62 disengages from the recess 615 and moves along the third and fourth inclined grooves 613, 614 to release the operating member 11.

For example, the second lock mechanism 5 may be a wheel rotation orientation mechanism. When the operating member 11 is pressed to unlock the wheel rotation orientation mechanism, the retaining mechanism 6 retains the operating member 11 at the unlock position, such that the wheel can still rotate freely even if the user releases the operating member 11. Furthermore, when the operating member 11 is actuated from the unlock position, the retaining mechanism 6 releases the operating member 11, such that the operating member 11 slides to lock the wheel rotation orientation mechanism and then the wheel is locked.

Figure 16:
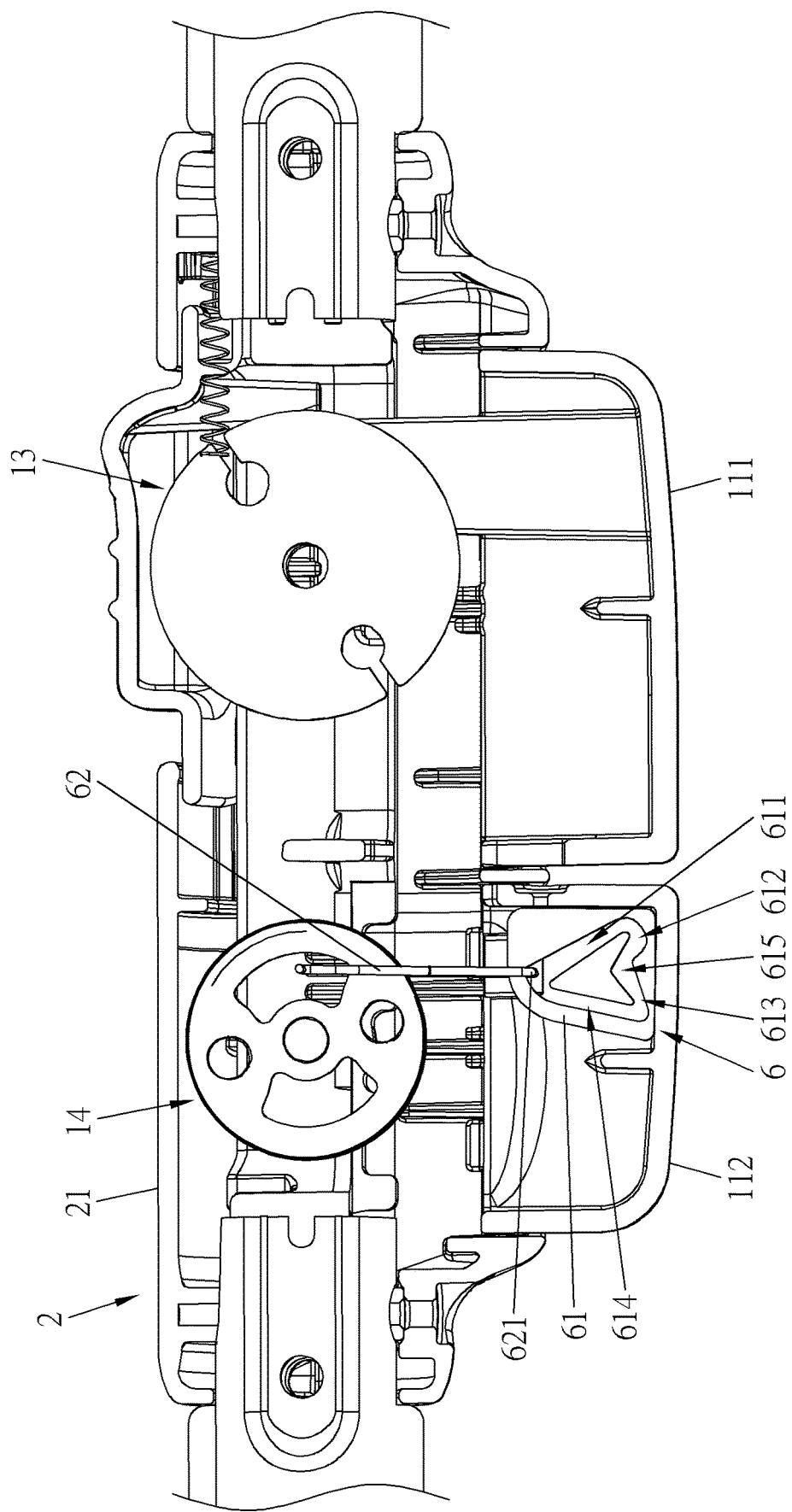
FIG. 16 is a sectional view illustrating a retaining mechanism of the invention disposed on a second operating member.
Figure 17:
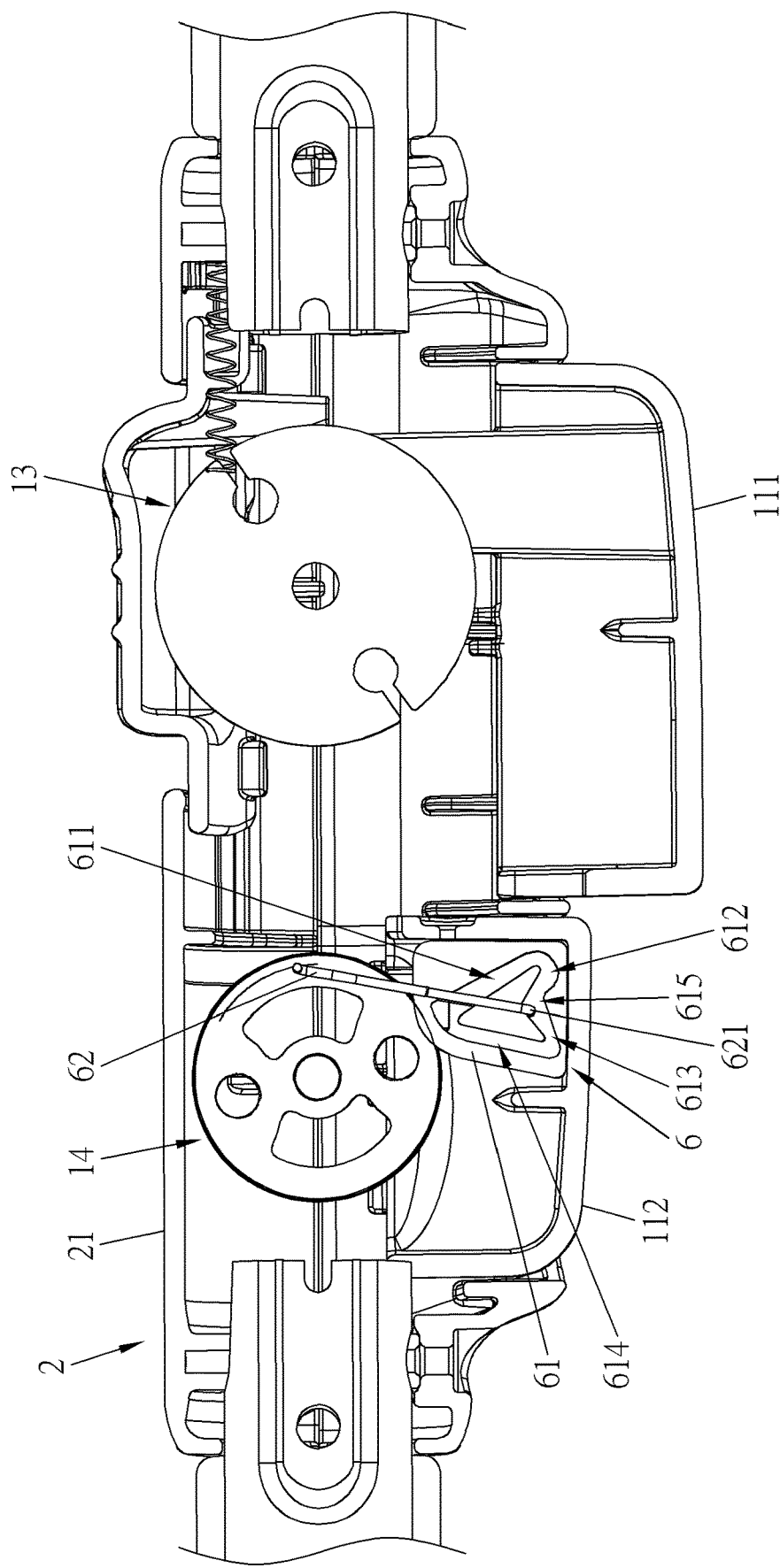
FIG. 17 is a sectional view illustrating the second operating member shown in FIG. 16 being pressed upward.

Referring to FIGS. 16 and 17, the at least one operating member of the invention may comprise a first operating member 111 and a second operating member 112, wherein the first operating member 111 slides to drive the first unlock module 13 to move to unlock the first lock mechanism 4, and the second operating member 112 slides to drive the second unlock module 14 to move to unlock the second lock mechanism 5. In other words, the invention may also use two operating members 111, 112 to unlock two different lock mechanisms 4, 5. In this embodiment, the retaining mechanism 6 may be disposed on the second operating member 112, but is not so limited. In another embodiment, the retaining mechanism 6 may also be disposed on the first operating member 111.

When a user presses the second operating member 112 to unlock the second lock mechanism 5, the engaging portion 621 of the second engaging member 62 moves along the first and second inclined grooves 611, 612 and then engages in a recess 615 between the second and third inclined grooves 612, 613 to retain the second operating member 112 at the unlock position (as shown in FIG. 17). At this time, the second lock mechanism 5 is retained at the unlock position. Furthermore, when the second operating member 112 is actuated from the unlock position (i.e. the second operating member 112 located at the unlock position is pressed again), the engaging portion 621 of the second engaging member 62 disengages from the recess 615 and moves along the third and fourth inclined grooves 613, 614 to release the second operating member 112, such that the second operating member 112 slides to lock the second lock mechanism 5.

In an exemplary embodiment, the second lock mechanism 5 could be, but not limited to, one of the lock mechanism need to hold on or keep in the status, such as, wheel braking, and wheel swiveling lock; and the first lock mechanism 4 could be, but not limited to, one of the lock mechanism of handle conversion, wheel braking, handle angle adjustment, frame folding and wheel swiveling lock, but their functions will not duplicate each other.

Figure 18:
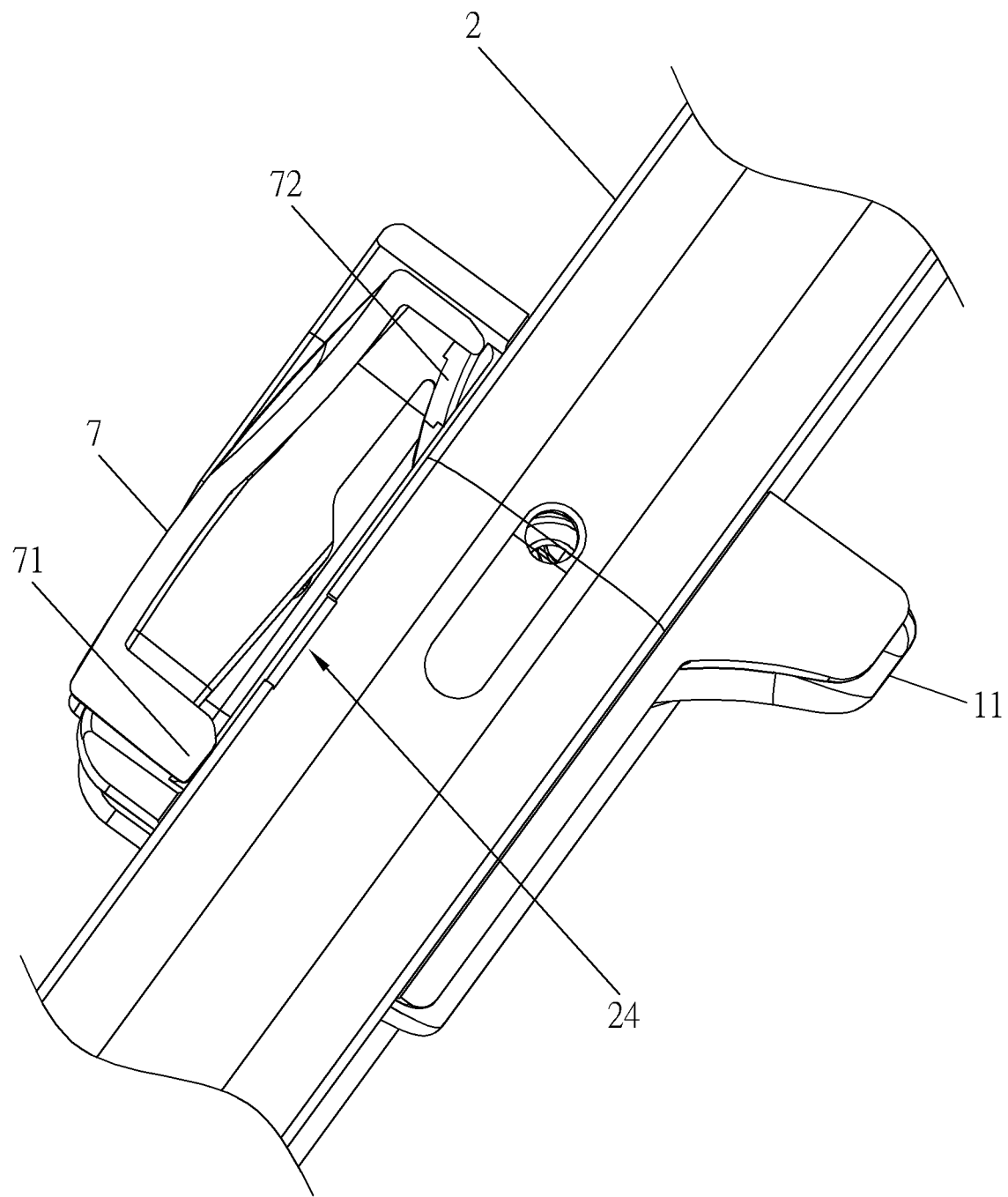
FIG. 18 is a sectional view illustrating a retaining mechanism of the invention disposed on an operating member.
Figure 19:
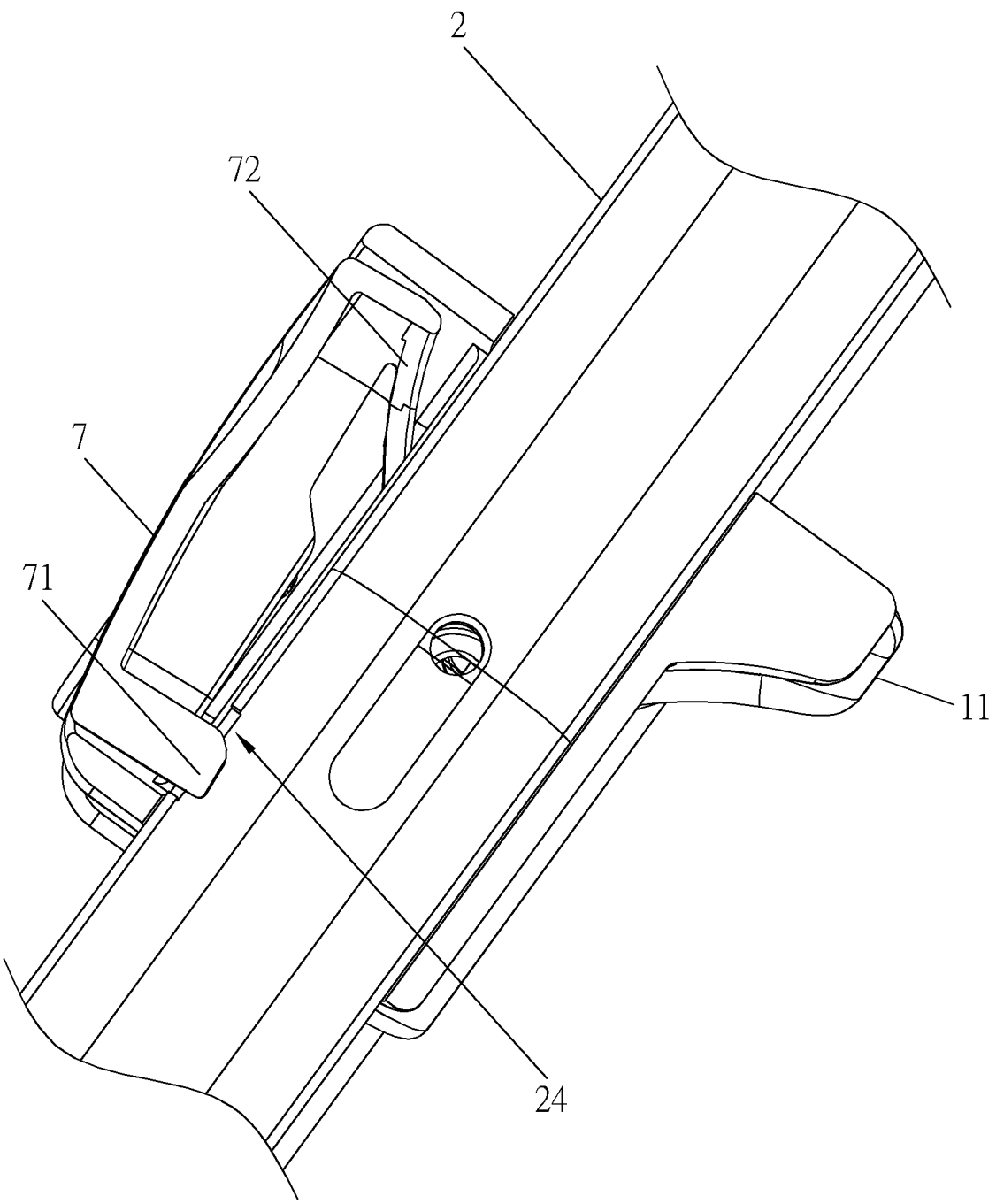
FIG. 19 is a sectional view illustrating the operating member shown in FIG. 18 being pulled upward.

Referring to FIGS. 18 and 19, a retaining mechanism 7 is pivotally connected to the operating member 11 and comprises an engaging portion 71 and an elastic portion 72. Furthermore, the frame 2 has an engaging hole 24. In this embodiment, the operating member 11 may be configured to unlock the aforesaid second lock mechanism 5. As shown in FIG. 18, the engaging portion 71 of the retaining mechanism 7 abuts against the frame 2 and the elastic portion 72 of retaining mechanism 7 is compressed by the frame 2 before the operating member 11 slides to unlock the second lock mechanism 5. As shown in FIG. 19, when the operating member 11 slides to unlock the second lock mechanism 5, the elastic portion 72 provides an elastic force to drive the retaining mechanism 7 to rotate and the engaging portion 71 engages in the engaging hole 24, such that the operating member 11 is retained at the unlock position. The user may press the retaining mechanism 7 to disengage the engaging portion 71 from the engaging hole 24 to release the operating member 11, such that the operating member 11 slides to lock the second lock mechanism 5.

Figure 20:
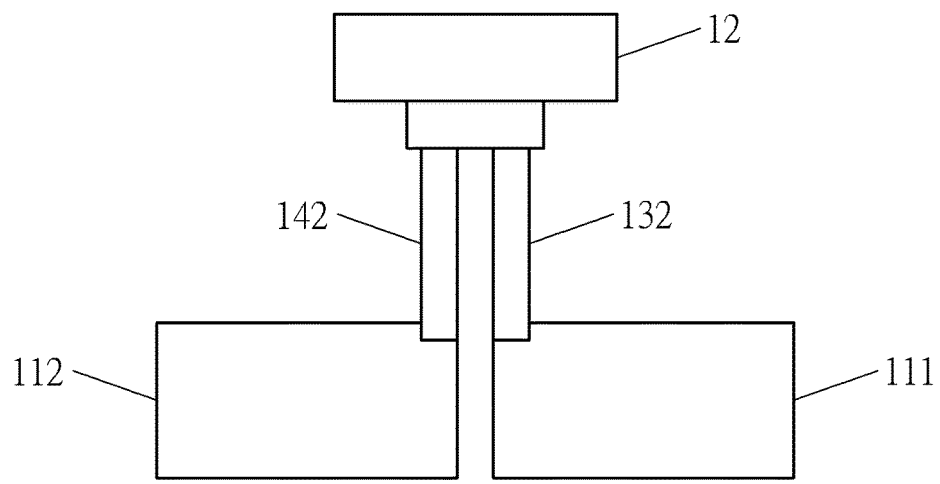
FIG. 20 is a schematic view illustrating a selecting member of the invention abutting against a first sliding member and a second sliding member.
Figure 21:
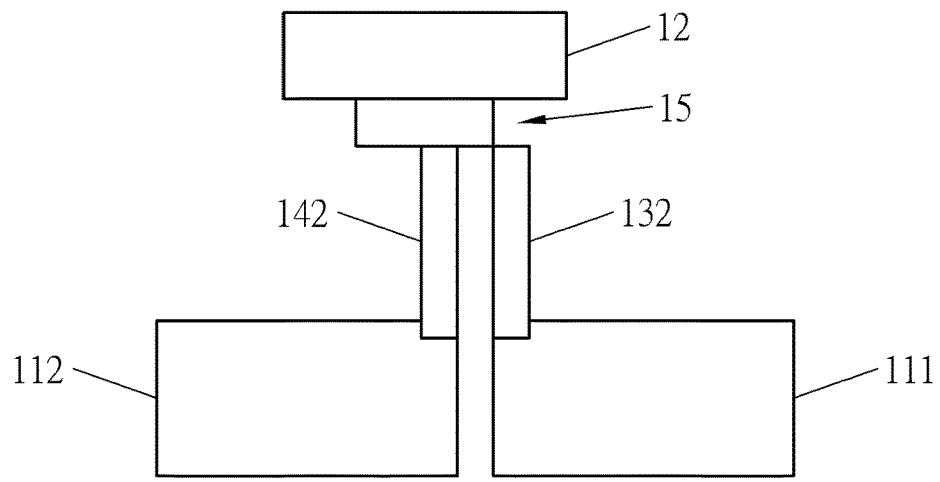
FIG. 21 is a schematic view illustrating the selecting member shown in FIG. 20 sliding leftward.
Figure 22:
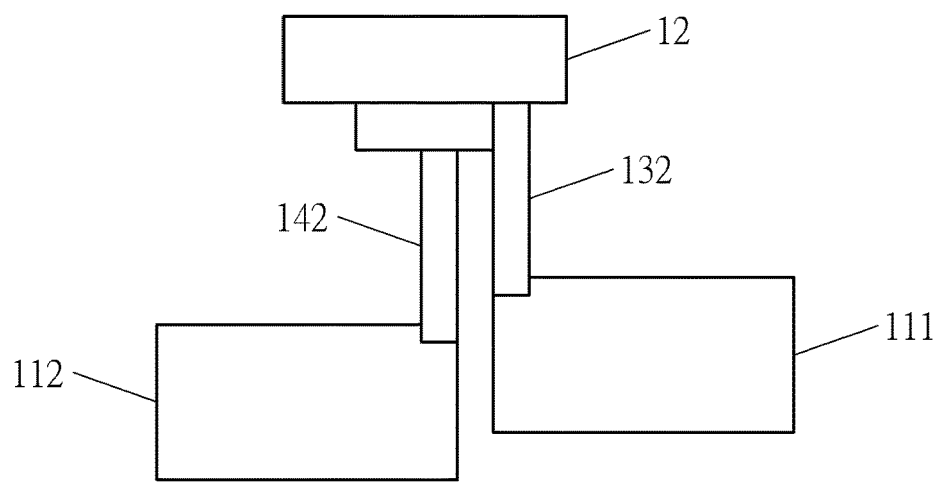
FIG. 22 is a schematic view illustrating the first operating member shown in FIG. 21 being pressed upward.
Figure 23:
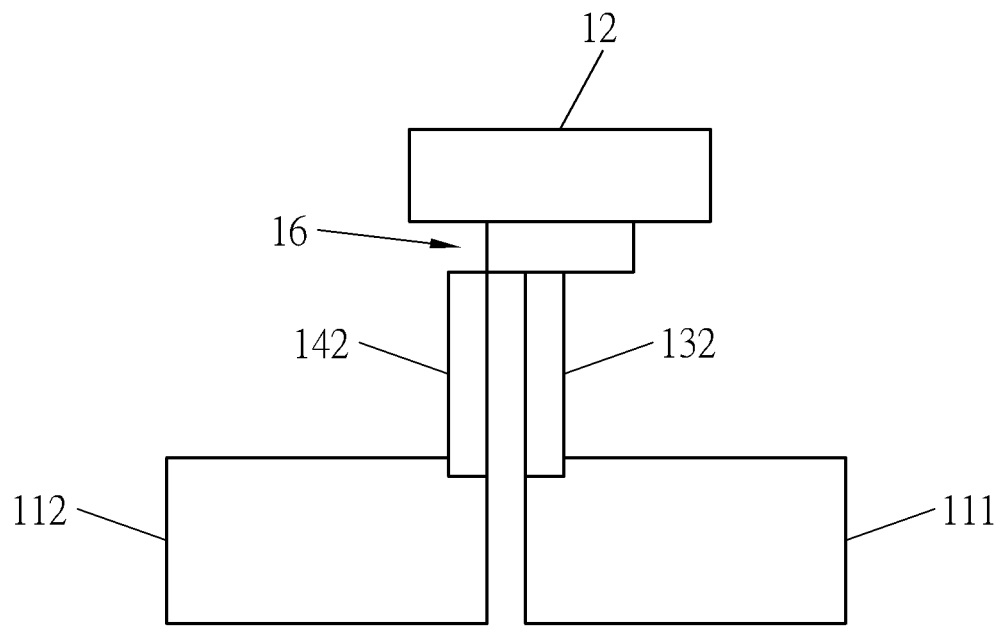
FIG. 23 is a schematic view illustrating the selecting member shown in FIG. 20 sliding rightward.
Figure 24:
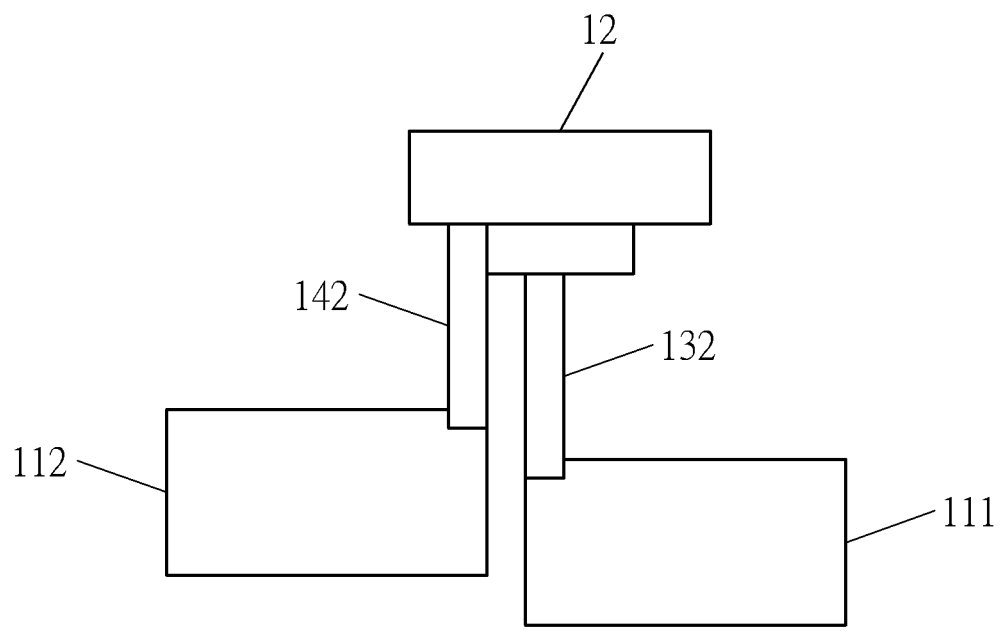
FIG. 24 is a schematic view illustrating the second operating member shown in FIG. 23 being pressed upward.

Referring to FIGS. 20 to 24, the at least one operating member of the invention may comprise a first operating member 111 and a second operating member 112, wherein the first operating member 111 slides to drive the first sliding member 132 to move to unlock the first lock mechanism 4, and the second operating member 112 slides to drive the second sliding member 142 to move to unlock the second lock mechanism 5. In this embodiment, the selecting member 12 is movably disposed on the aforesaid frame 2, such that the selecting member 12 can move between a first position (as shown in FIG. 21) and a second position (as shown in FIG. 23) with respect to the aforesaid frame 2. In the beginning, the first sliding member 132 and the second sliding member 142 abut against the selecting member 12, as shown in FIG. 20. When the first lock mechanism 4 needs to be unlocked, the selecting member 12 is operated to move leftward (as shown in FIG. 21), such that the selecting member 12 is separated from the first sliding member 132 to unlock the first operating member 111 and the second sliding member 142 still abuts against the selecting member 12. At this time, a first accommodating space 15 is formed between the first sliding member 132 and the selecting member 12. When the first operating member 111 is pressed (as shown in FIG. 22), the first operating member 111 slides upward to push the first sliding member 132 to slide, so as to unlock the first lock mechanism 4. When the second lock mechanism 5 needs to be unlocked, the selecting member 12 is operated to move rightward (as shown in FIG. 23), such that the selecting member 12 is separated from the second sliding member 142 to unlock the second operating member 112 and the first sliding member 132 still abuts against the selecting member 12. At this time, a second accommodating space 16 is formed between the second sliding member 142 and the selecting member 12. When the second operating member 12 is pressed (as shown in FIG. 24), the second operating member 112 slides upward to push the second sliding member 142 to slide, so as to unlock the second lock mechanism 5. It should be noted that how to unlock the first and second lock mechanisms 4, 5 has been depicted in detail in the above, so the repeated explanation will not be depicted herein again.

Figure 25:
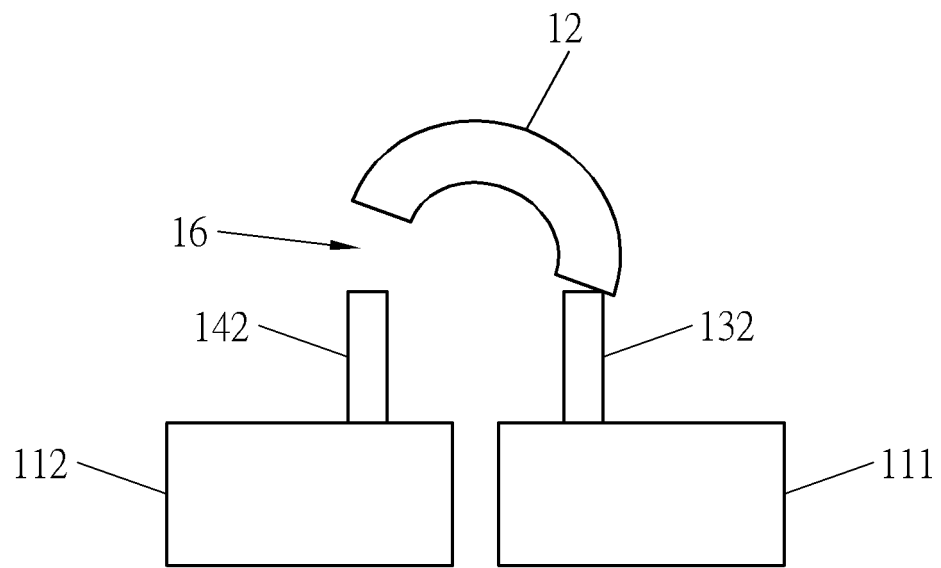
FIG. 25 is a schematic view illustrating a selecting member of the invention abutting against a first sliding member.
Figure 26:
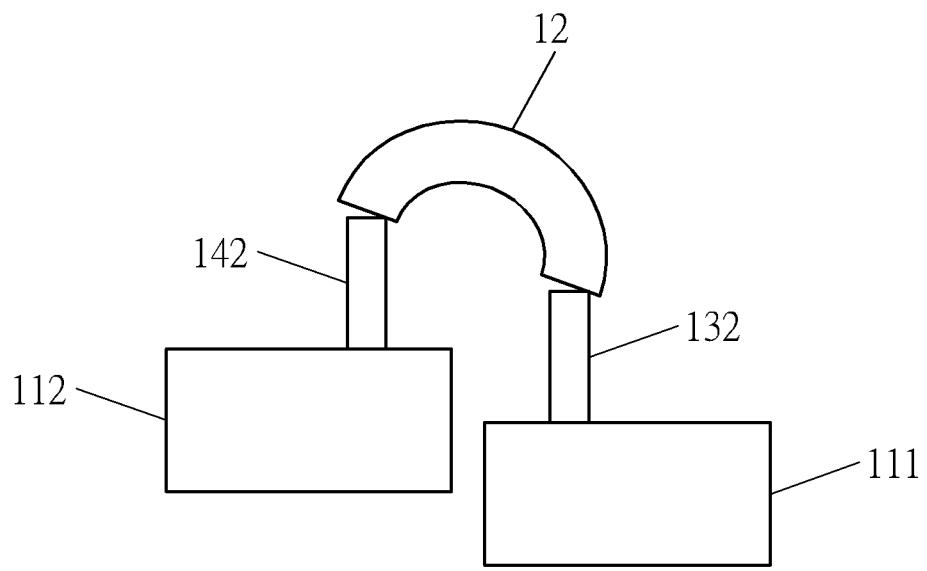
FIG. 26 is a schematic view illustrating the second operating member shown in FIG. 25 being pressed upward.
Figure 27:
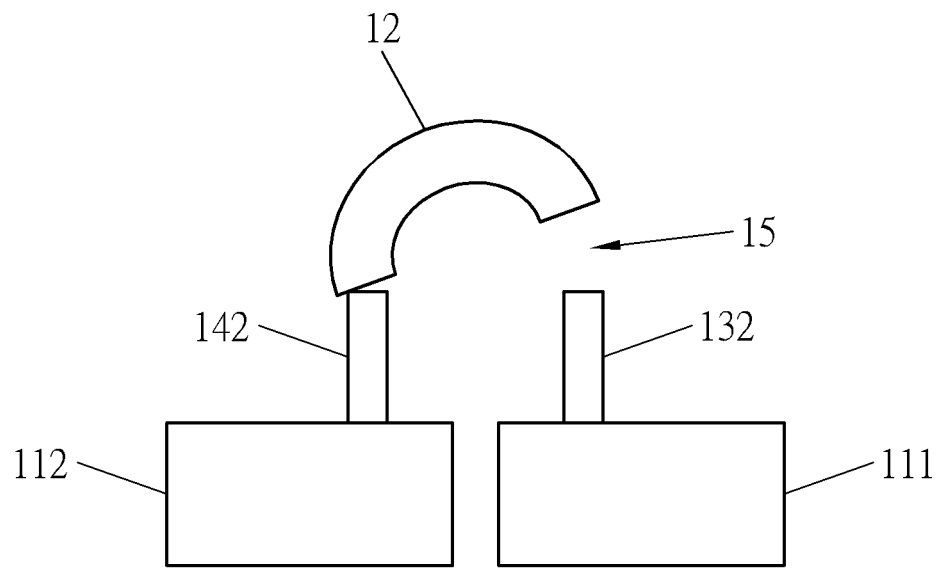
FIG. 27 is a schematic view illustrating the selecting member shown in FIG. 25 abutting against a second sliding member.
Figure 28:
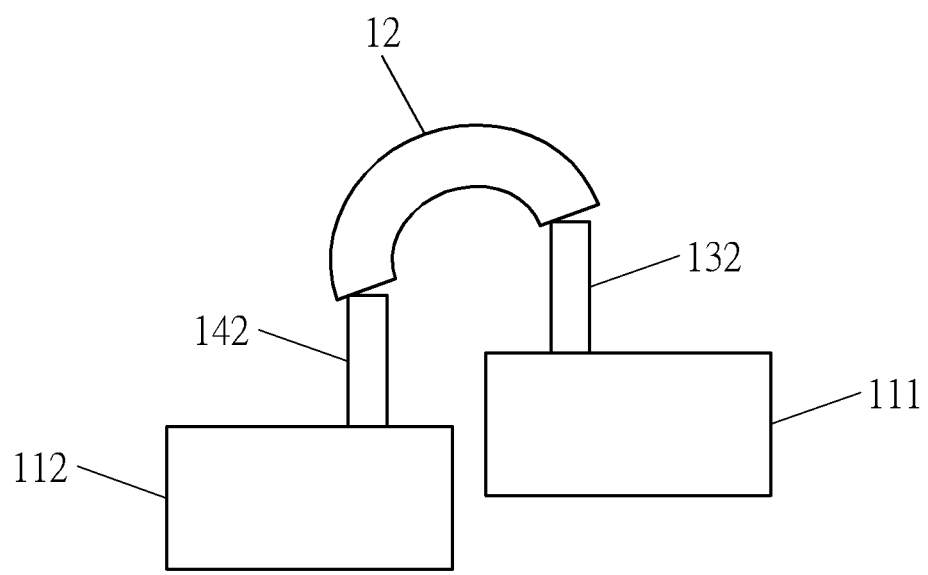
FIG. 28 is a schematic view illustrating the first operating member shown in FIG. 27 being pressed upward.

Referring to FIGS. 25 to 28, the at least one operating member of the invention may comprise a first operating member 111 and a second operating member 112, wherein the first operating member 111 slides to drive the first sliding member 132 to move to unlock the first lock mechanism 4, and the second operating member 112 slides to drive the second sliding member 142 to move to unlock the second lock mechanism 5. In this embodiment, the selecting member 12 is pivotally connected to the aforesaid frame 2, such that the selecting member 12 can rotate between a first position (as shown in FIG. 27) and a second position (as shown in FIG. 25) with respect to the aforesaid frame 2. In the beginning, the selecting member 12 is located at the second position, such that the selecting member 12 is separated from the second sliding member 142 to unlock the second operating member 112 and the first sliding member 132 abuts against the selecting member 12 to lock the first operating member 111. At this time, a second accommodating space 16 is formed between the second sliding member 142 and the selecting member 12. In this embodiment, a torsion spring or the like may be used to keep the selecting member 12 at the second position. When the second operating member 112 is pressed (as shown in FIG. 26), the second operating member 112 slides upward to push the second sliding member 142 to slide, so as to unlock the second lock mechanism 5. When the first lock mechanism 4 needs to be unlocked, the selecting member 12 is operated to rotate counterclockwise (as shown in FIG. 27), such that the selecting member 12 is separated from the first sliding member 132 to unlock the first operating member 111 and the second sliding member 142 abuts against the selecting member 12 to lock the second operating member 112. At this time, a first accommodating space 15 is formed between the first sliding member 132 and the selecting member 12. When the first operating member 111 is pressed (as shown in FIG. 28), the first operating member 111 slides upward to push the first sliding member 132 to slide, so as to unlock the first lock mechanism 4. It should be noted that if the selecting member 12 is released from the first position shown in FIG. 27, the torsion spring will force the selecting member 12 to rotate to the second position shown in FIG. 25, so as to avoid misoperation of the first operating member 111. It should be noted that how to unlock the first and second lock mechanisms 4, 5 has been depicted in detail in the above, so the repeated explanation will not be depicted herein again.

As mentioned in the above, the invention uses at least one operating member to drive the first unlock module to move to unlock the first lock mechanism or drive the second unlock module to move to unlock the second lock mechanism. In an embodiment, a selecting member may be movably disposed on the frame and capable of moving between a first position and a second position with respect to the frame. When the selecting member is located at the first position, the first lock mechanism corresponds to the operating member, such that the operating member can slide to drive the first unlock module to move to unlock the first lock mechanism. When the selecting member is located at the second position, the second lock mechanism corresponds to the operating member, such that the operating member can slide to drive the second unlock module to move to unlock the second lock mechanism. Accordingly, the invention does not need to dispose two independent unlock devices for unlocking the first and second lock mechanisms. That is to say, the invention can use one single unlock device to unlock two different lock mechanisms. Therefore, the manufacturing cost is reduced, the unlock device of the invention occupies less space of the stroller, and the operation is easy and convenient.

In another embodiment, the invention may use a retaining mechanism to retain the operating member at an unlock position when the operating member slides to unlock the first lock mechanism or the second lock mechanism. Accordingly, the first lock mechanism or the second lock mechanism can be retained at an unlock state until the operating member is actuated from the unlock position. For example, the second lock mechanism may be a wheel rotation orientation mechanism and the retaining mechanism may retain the operating member at an unlock position when the operating member slides to unlock the second lock mechanism. When a user presses the operating member to unlock the wheel rotation orientation mechanism, the wheel rotation orientation mechanism is retained at the unlock position, such that a wheel can still rotate freely even if the user releases the operating member. Furthermore, when the operating member is actuated from the unlock position, the retaining mechanism releases the operating member, such that the operating member slides to lock the wheel rotation orientation mechanism and then the wheel is locked.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An unlock device comprising:
   at least one operating member movably disposed on a frame, the frame being equipped with a first lock mechanism and a second lock mechanism;
   a first unlock module movably disposed on the frame and connected to the first lock mechanism, the first unlock module comprising a first sliding member slidably disposed on the frame;
   a second unlock module movably disposed on the frame and connected to the second lock mechanism, the second unlock module comprising a second sliding member slidably disposed on the frame; and
   a selecting member movably disposed on the frame, the first sliding member and the second sliding member moving as the selecting member moves;
   wherein the at least one operating member moves to drive the first unlock module to move to unlock the first lock mechanism or drive the second unlock module to move to unlock the second lock mechanism.

2. The unlock device of claim 1, wherein the selecting member moves between a first position and a second position with respect to the frame; when the selecting member is located at the first position, the at least one operating member slides to drive the first unlock module to move to unlock the first lock mechanism; and when the selecting member is located at the second position, the at least one operating member slides to drive the second unlock module to move to unlock the second lock mechanism.

3. The unlock device of claim 2, wherein sliding directions of the first and second sliding members are identical to a sliding direction of the at least one operating member.

4. The unlock device of claim 3, wherein the first unlock module further comprises a first rotating member pivotally connected to the frame, the second unlock module further comprises a second rotating member pivotally connected to the frame, and the first and second sliding members are configured to drive the first and second rotating members to rotate, respectively.

5. The unlock device of claim 4, wherein the first rotating member has a first protruding portion, the first sliding member moves to push the first protruding portion to rotate the first rotating member, the second rotating member has a second protruding portion, and the second sliding member moves to push the second protruding portion to rotate the second rotating member.

6. The unlock device of claim 5, wherein the first sliding member has a first engaging groove, the first protruding portion is slidably disposed in the first engaging groove, the second sliding member has a second engaging groove, and the second protruding portion is slidably disposed in the second engaging groove.

7. The unlock device of claim 4, wherein the first rotating member has a first connecting member, the first connecting member is eccentric with respect to a rotation center of the first rotating member and connected to the first lock mechanism, the second rotating member has a second connecting member, and the second connecting member is eccentric with respect to a rotation center of the second rotating member and connected to the second lock mechanism.

8. The unlock device of claim 3, wherein the selecting member has a first receiving hole and a second receiving hole, an end of the first sliding member is slidably inserted into the first receiving hole, and an end of the second sliding member is slidably inserted into the second receiving hole.

9. The unlock device of claim 4, wherein the first sliding member comprises a first sliding portion, a first driving portion and a first restricting portion, the first sliding portion is slidably inserted into the selecting member, the first driving portion is connected to the first rotating member, the first restricting portion is disposed at a side of the first driving portion, the second sliding member comprises a second sliding portion, a second driving portion and a second restricting portion, the second sliding portion is slidably inserted into the selecting member, the second driving portion is connected to the second rotating member, the second restricting portion is disposed at a side of the second driving portion.

10. The unlock device of claim 3, wherein a first accommodating space is formed between the first sliding member and the at least one operating member or between the first sliding member and the selecting member, and a second accommodating space is formed between the second sliding member and the at least one operating member or between the second sliding member and the selecting member.

11. The unlock device of claim 2, wherein an elastic member is disposed between the selecting member and the frame and configured to make the selecting member away from the first position.

12. The unlock device of claim 11, wherein the elastic member provides an elastic force to force the selecting member to return to the second position.

13. The unlock device of claim 11, wherein the frame has a protruding block, an end of the elastic member is sleeved on the protruding block and abuts against the frame, and another end of the elastic member abuts against the selecting member.

14. The unlock device of claim 1, wherein the at least one operating member comprises a first operating member and a second operating member, the first operating member slides to drive the first unlock module to move to unlock the first lock mechanism, and the second operating member slides to drive the second unlock module to move to unlock the second lock mechanism.

15. The unlock device of claim 1, further comprising a retaining mechanism disposed on the at least one operating member, the retaining mechanism retaining the at least one operating member at an unlock position when the at least one operating member slides to unlock one of the first lock mechanism and the second lock mechanism, the retaining mechanism releasing the at least one operating member when the at least one operating member is actuated from the unlock position.

16. The unlock device of claim 15, wherein the retaining mechanism comprises a first engaging member and a second engaging member, the first engaging member is fixed on the at least one operating member, the second engaging member is connected to the frame, the first engaging member has a first inclined groove, a second inclined groove, a third inclined groove and a fourth inclined groove connected to each other, an engaging portion of the second engaging member moves along the first and second inclined grooves and then engages in a recess between the second and third inclined grooves to retain the at least one operating member at the unlock position, and the engaging portion of the second engaging member disengages from the recess and moves along the third and fourth inclined grooves to release the at least one operating member.

17. The unlock device of claim 15, wherein the retaining mechanism is pivotally connected to the at least one operating member and comprises an engaging portion and an elastic portion, the frame has an engaging hole, the engaging portion abuts against the frame and the elastic portion is compressed by the frame before the at least one operating member slides to unlock the second lock mechanism, and the elastic portion drives the retaining mechanism to rotate and the engaging portion engages in the engaging hole when the at least one operating member slides to unlock the second lock mechanism.

18. A stroller comprising:
a frame;
a wheel socket rotatably disposed on a leg of the frame;
a first lock mechanism disposed on the frame and configured to fold the frame;
a second lock mechanism disposed on the frame and configured to lock the wheel socket; and
the unlock device of claim 1 configured to unlock the first lock mechanism and the second lock mechanism.

19. The stroller of claim 18, wherein the second lock mechanism comprises a linkage member and a positioning assembly, the positioning assembly comprises a first drag member, a second drag member, a positioning member and a return member, the wheel socket has a positioning portion, the linkage member is slidably disposed on the frame, an end of the first drag member is connected to the linkage member, another end of the first drag member is connected to the positioning member, the positioning member is movably disposed on the leg and capable of being connected to or separated from the positioning portion, the return member provides an elastic force for pushing the positioning member toward the positioning portion, and the second drag member is connected between the second unlock module and the linkage member.

20. The stroller of claim 19, wherein the positioning portion is a positioning hole, the positioning member is a positioning pillar, and the positioning pillar is telescopically disposed in the positioning hole.

21. The stroller of claim 18, wherein the unlock device is disposed on a handle of the frame.

* * * * *